United States Patent
Morino et al.

(10) Patent No.: US 9,995,624 B2
(45) Date of Patent: Jun. 12, 2018

(54) OPTICAL MEASUREMENT DEVICE

(71) Applicant: OMRON Corporation, Kyoto-shi, Kyoto (JP)

(72) Inventors: Hisayasu Morino, Fukuchiyama (JP); Jun Takashima, Uzi (JP); Kenichi Matoba, Otsu (JP); Masayuki Hayakawa, Kizugawa (JP); Naoki Fujiwara, Kyoto (JP); Mariko Marukawa, Fukuchiyama (JP)

(73) Assignee: OMRON Corporation, Kyoto-shi (JP)

( * ) Notice: Subject to any disclaimer, the term of this patent is extended or adjusted under 35 U.S.C. 154(b) by 0 days. days.

(21) Appl. No.: 15/363,286

(22) Filed: Nov. 29, 2016

(65) Prior Publication Data

US 2017/0160130 A1 Jun. 8, 2017

(30) Foreign Application Priority Data

Dec. 3, 2015 (JP) ................................. 2015-236965

(51) Int. Cl.
| | |
|---|---|
| *G01J 3/28* | (2006.01) |
| *G01J 3/02* | (2006.01) |
| *G01B 11/245* | (2006.01) |
| *G01J 3/10* | (2006.01) |
| *G02B 6/02* | (2006.01) |
| *G01B 11/06* | (2006.01) |

(52) U.S. Cl.
CPC ........ *G01J 3/0218* (2013.01); *G01B 11/0608* (2013.01); *G01B 11/245* (2013.01); *G01J 3/10* (2013.01); *G01J 3/2803* (2013.01); *G02B 6/02042* (2013.01); *G01B 2210/50* (2013.01)

(58) Field of Classification Search
CPC .......... G01J 3/0218; G01J 3/10; G01J 3/2803; G01B 11/245; G02B 6/02042
USPC ......................................... 356/326
See application file for complete search history.

(56) References Cited

U.S. PATENT DOCUMENTS

| | | | |
|---|---|---|---|
| 6,674,572 B1 | 1/2004 | Scherueble et al. | |
| 2004/0086231 A1* | 5/2004 | Fukuyama | ........... G02B 6/3636 385/49 |

(Continued)

FOREIGN PATENT DOCUMENTS

| | | |
|---|---|---|
| DE | 112008002244 B4 | 7/2010 |
| EP | 2500685 A1 | 9/2012 |

(Continued)

*Primary Examiner* — Hina F Ayub
(74) *Attorney, Agent, or Firm* — Metrolexis Law Group, PLLC

(57) ABSTRACT

To improve light use efficiency and thereby achieve even higher sampling rates. An optical measurement device includes: a light source configured to emit illumination light including a plurality of wavelength components; an optical system configured to introduce an axial chromatic aberration into the illumination light from the light source and to receive reflection light reflecting from a measurement object where at least a portion of the measurement object lies along a line extending from the optical axis of the optical system; a spectrometer for separating the reflection light received at the optical system into wavelength components, and a detector including a plurality of light receiving elements arranged one-dimensionally to correspond to the dispersion direction of the spectrometer.

15 Claims, 23 Drawing Sheets

(56) References Cited

U.S. PATENT DOCUMENTS

| | | | | |
|---|---|---|---|---|
| 2007/0165987 A1* | 7/2007 | Monma | ............ | G02B 6/30 |
| | | | | 385/89 |
| 2012/0213475 A1* | 8/2012 | Selli | ............ | G02B 6/4214 |
| | | | | 385/33 |
| 2015/0192735 A1* | 7/2015 | Ellis-Monaghan | .... | G02B 6/122 |
| | | | | 385/14 |
| 2015/0260504 A1 | 9/2015 | Schönleber et al. | | |
| 2017/0090118 A1* | 3/2017 | Sodagar | ............ | G02B 5/20 |

FOREIGN PATENT DOCUMENTS

| | | |
|---|---|---|
| EP | 2950039 A1 | 12/2015 |
| FR | 2950441 A1 | 3/2011 |
| JP | 2012-208102 A | 10/2012 |
| WO | 2002002012 A1 | 1/2002 |
| WO | 2014076649 A1 | 5/2014 |

\* cited by examiner

OPTICAL MEASUREMENT DEVICE

CROSS-REFERENCES TO RELATED APPLICATIONS

This application claims priority to Japanese Patent Application No. 2015-236965 filed on Dec. 3, 2015, the entire contents of which are incorporated herein by reference.

FIELD

The present invention relates to a measurement device capable of measuring, for example, the surface topography of a measurement object using white light confocal principles.

BACKGROUND

White light confocal optical measurement devices are known as devices used for examining the surface topography of a measurement object. For instance, Japanese Patent Application Publication No 2012-208102 discloses a confocal measurement device that uses confocal optics for contactless measurement of the displacement of a measurement object.

International Publication Pamphlet No 2014/076649 discloses a configuration where a plurality of points is arranged mutually adjacent within a shared measurement head guide, and each of the points is measured simultaneously by different detectors to thereby measure the surface topography of the measurement object.

International Publication Pamphlet No 02/02012 discloses a configuration where a measurement object is measured three-dimensionally using a two-dimensional matrix of photoelectric sensors.

TECHNICAL PROBLEM

The white light confocal principle uses only the specific wavelength component of illumination light that corresponds to a given distance. Thus, white light confocal measurement suffers from lower light use efficiency compared to triangulation measurement systems that use a monochrome laser. Consequently, increasing the sampling rate to provide for higher-speed inspections of the measurement object could be problematic because it may result in having insufficient light intensity available for measurements.

Embodiments of the present invention provide a configuration which, when compared to the above mention related art, improves the light use efficiency, and is thereby capable of achieving higher sampling rates.

SUMMARY

According to one aspect of the invention, an optical measurement device includes: a light source configured to emit illumination light including a plurality of wavelength components; an optical system configured to introduce an axial chromatic aberration into the illumination light from the light source and to receive reflection light reflecting from a measurement object where at least a portion of the measurement object lies along a line extending from the optical axis of the optical system; a light receiving unit including a spectrometer for separating the reflection light received at the optical system into wavelength components, and a detector including a plurality of light receiving elements arranged one-dimensionally to correspond to the dispersion direction of the spectrometer; a light guide including a plurality of cores optically connecting the optical system and the light receiving unit; and a processor configured to compute the distance from the optical system to the measurement object on the basis of a detection value from each of the plurality of light receiving elements in the light receiving unit. The light guide and the light receiving unit are configured so that when a first beam of a first wavelength is provided from the optical system to a first core among the plurality of cores, the light receiving elements at which said first beam enters is the same as at least a portion of the light receiving elements at which a second light beam of the first wavelength enters when the second light beam is provided from the optical system to a second core among the plurality of cores.

The part of the light guide optically connected to the light receiving unit may be arranged so that the alignment direction of the plurality of cores contained therein maps to a direction orthogonal to the arrangement direction of the plurality of light receiving elements.

The processor may collectively acquire the detection values generated when a plurality of light beams radiating from each of the plurality of cores enters a single light receiving element.

According to another aspect of the invention, an optical measurement device includes: a light source configured to emit illumination light including a plurality of wavelength components; an optical system configured to introduce an axial chromatic aberration into the illumination light from the light source and to receive reflection light reflecting from a measurement object where at least a portion of the measurement object lies along a line extending from the optical axis of the optical system; a light receiving unit including a spectrometer for separating the reflection light received at the optical system into wavelength components, and a detector including a plurality of light receiving elements arranged two-dimensionally on a detection surface; a light guide including a plurality of cores optically connecting the optical system and the light receiving unit; and a processor configured to compute the distance from the optical system to the measurement object. The processor computes the distance using the detection values from the plurality of light receiving elements in the light receiving unit on the basis of the positional relationship between a first area on the detection surface where a first light beam of a first wavelength enters when the first light beam is provided from the optical system to a first core among the plurality of cores, and a second area on the detection surface where a second light beam of the first wavelength enters when the second light beam of the first wavelength is provided from the optical system to a second core among the plurality of cores.

The processor may estimate an area suitable for detecting each of the wavelengths on the basis of a light intensity profile generated from spots of light beams of the same wavelength emitted from the plurality of cores and incident on the detection surface of the detector.

The processor may select a sub-region from the detection surface of the detector to use in detecting each of the wavelengths configured to be included in the reflection light.

The light receiving unit may further include reduction optics arranged along the optical path to the detector and configured to reduce the spot diameter of the reflection light that reflects from the measurement object, propagates through the plurality of cores included in the light guide, and enters the light receiving unit.

The reduction optics may be configured to reduce the spot diameter of the reflection light reflecting from the object to a larger extent in a specific direction in accordance with the horizontal-to-vertical ratio of the detection surface of the detector.

The optical measurement device may also include a selector configured to selectively supply illumination light from the light source to each of the plurality of cores in the light guide; and the processor may switch to the core used to irradiate the measurement object with illumination light in accordance with the shape of the measurement object.

The end surface in the light guide radiating illumination light from the light guide to the optical system is inclined at an angle greater than the critical angle of the interface between the core and the cladding in the light guide.

The light guide may include an optical fiber wrapped around a rod-like component.

EFFECTS

Embodiments of the present invention provide a configuration which, when compared to the above-mentioned related art, improves the light use efficiency, and thereby achieves even higher sampling rates.

DETAILED DESCRIPTION

Figure 1:
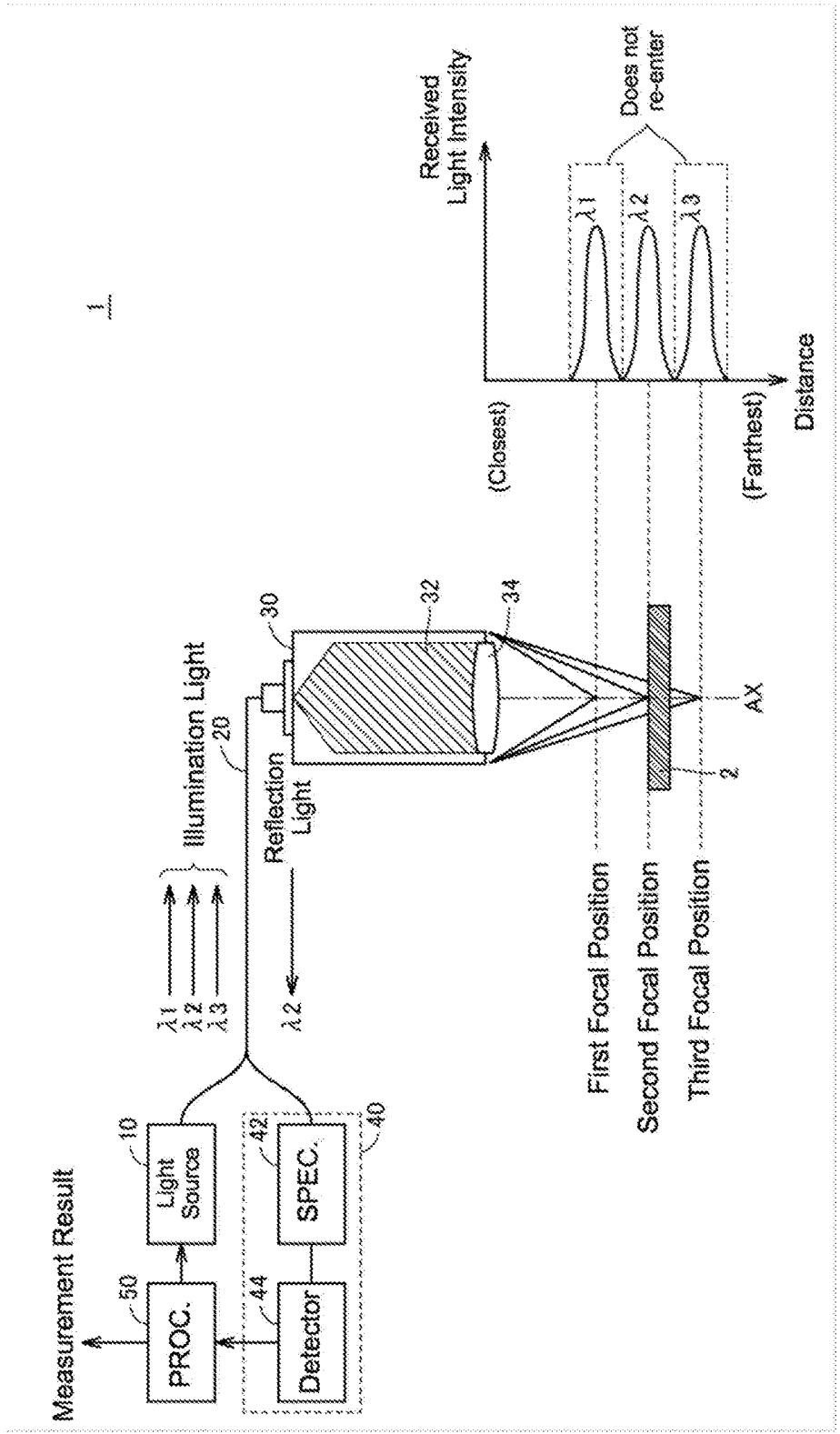
FIG. 1 is a diagram for explaining the principles of measuring displacement through white light confocal measurement.

Embodiments of the present invention are described in detail with reference to the drawings. The same or corresponding elements within the drawings will be given the same reference numerals and the explanations therefor will not be repeated.

A. Further Background and Overall Configuration

First, the problems to be addressed by an optical measurement device according to embodiments of the invention and an overview of a configuration for solving these problems are described.

FIG. 1 is a diagram for explaining the principles of measuring displacement through white light confocal measurement. Referring to FIG. 1, the optical measurement device 1 includes a light source 10, a light guide 20, a sensor head 30, a light receiving unit 40, and a processor 50. The sensor head 30 contains a chromatic aberration unit 32 and an objective 34; the light receiving unit 40 includes a spectrometer 42 and a detector 44.

The illumination light, which contains various specific wavelengths generated by the light source 10, propagates through the light guide 20 and arrives at the sensor head 30. The light radiating from the light source 10 is focused by the objective 34 in the sensor head 30 and illuminates the measurement object 2 (also referred to as "object 2").

As the illumination light passes through the chromatic aberration unit 32, the chromatic aberration unit 32 generates an axial chromatic aberration therein; therefore, the illumination light emerging from the objective 34 has focal points that differ by wavelength. Only light of a wavelength whose focal point coincides with the object 2 re-enters the confocal optical fiber in the light guide 20 of the sensor head 30. For the sake of brevity, the expression "reflecting only a specific optical wavelength" refers to the state in which the light with a wavelength whose focal point coincides with the position of the object 2. The reflection light that re-enters the sensor head 30 propagates through the light guide 20 and enters the light receiving unit 40. In the light receiving unit 40, the spectrometer 42 separates the reflection light entering therein into different wavelength components, and the detector 44 detects the intensity of each of the wavelength components. The processor 50 then calculates the distance (displacement) from the sensor head 30 to the object 2 on the basis of the detection results from the detector 44.

In the example illustrated in FIG. 1, for instance, illumination light containing a plurality of wavelengths λ1, λ2, λ3 is separated by wavelength, with an image being formed at different positions (e.g., the first focal point, second focal point, and third focal point) along an optical axis AX. The surface of the object 2 coincides with the second focal point on the optical axis AX and so only the component wavelength λ2 in the illumination light is reflected. The component wavelength λ2 is detected in the light receiving unit 40, and the distance from the sensor head 30 to the object 2 computed as equivalent to the focal position of the wavelength λ2.

The detector 44 in the light receiving unit 40 is made up of a plurality of light receiving elements; the light receiving element changes on receiving the reflection light in accordance with the shape of the surface of the object 2 in relation to the sensor head 30; consequently, the detection results (pixel information) from the plurality of light receiving elements in the detector 44 can be used to measure the change in distance (displacement) to the object 2.

As illustrated in FIG. 1, although the illumination light containing the wavelengths λ1, λ2, λ3 irradiates the object 2, the only component detected as reflection light is the component wavelength λ2. Thus, white light confocal measurement has lower light usage efficiency because its underlying principle requires using only a specific wavelength component from the illumination light corresponding to a given distance. Thus, for instance, increasing the sampling rate to provide higher-speed inspections of the surface topology of the measurement object could be problematic because it may result in having insufficient light intensity available for measurements.

In light of this problem, for instance, although one conceivable approach would be to increase the light intensity of the illumination light generated by the light source 10, there are limitations on the light emitting power of the device adopted as the light source 10, which thusly tends to make it difficult to make substantial improvements to the light use efficiency.

Instead of dealing with the light source, another reasonable approach would be to increase the propagation capacity as much as possible in the light guide 20, which optically couples the light source 10 and light receiving unit 40 to the sensor head 30; an alternate solution would be to minimize the amount of propagation loss in the light guide 20.

More specifically, for the first case, one way is to increase the diameter of the core in the optical fiber making up the light guide 20. Increasing the diameter of the core may allow even more light to propagate therethrough; however, the drawback when using the white light confocal principle is a decrease in measurement performance (spectral resolution). Additionally, using a larger diameter fiber as the light guide also adversely affects the usability of the device; for instance, the optical fiber is less flexible.

Considering these potential drawbacks, the embodiments adopt a different approach. That is, the optical fiber making up the light guide 20 is provided with parallel (multiple) cores to thereby increase the amount of reflection light that enters the light receiving unit 40. The inventors, through diligent experimentation also discovered a heretofore unknown problem caused by providing parallel cores, and also discovered a novel solution to this unknown problem. This new problem, and a novel means of addressing this new problem are described below.

B. Parallel Core Concept

Figure 2A:
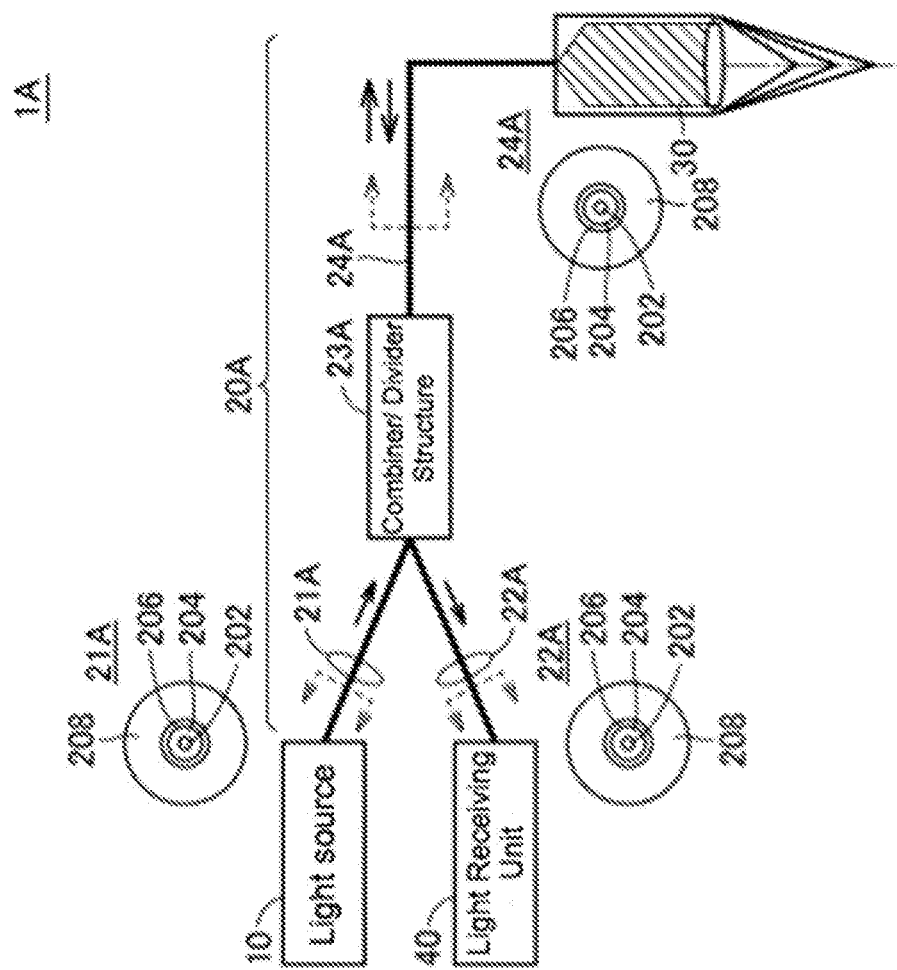
FIGS. 2A and 2B are schematic views for describing the parallel arrangement of cores adopted in an optical measurement device according to an embodiment.
Figure 2B:
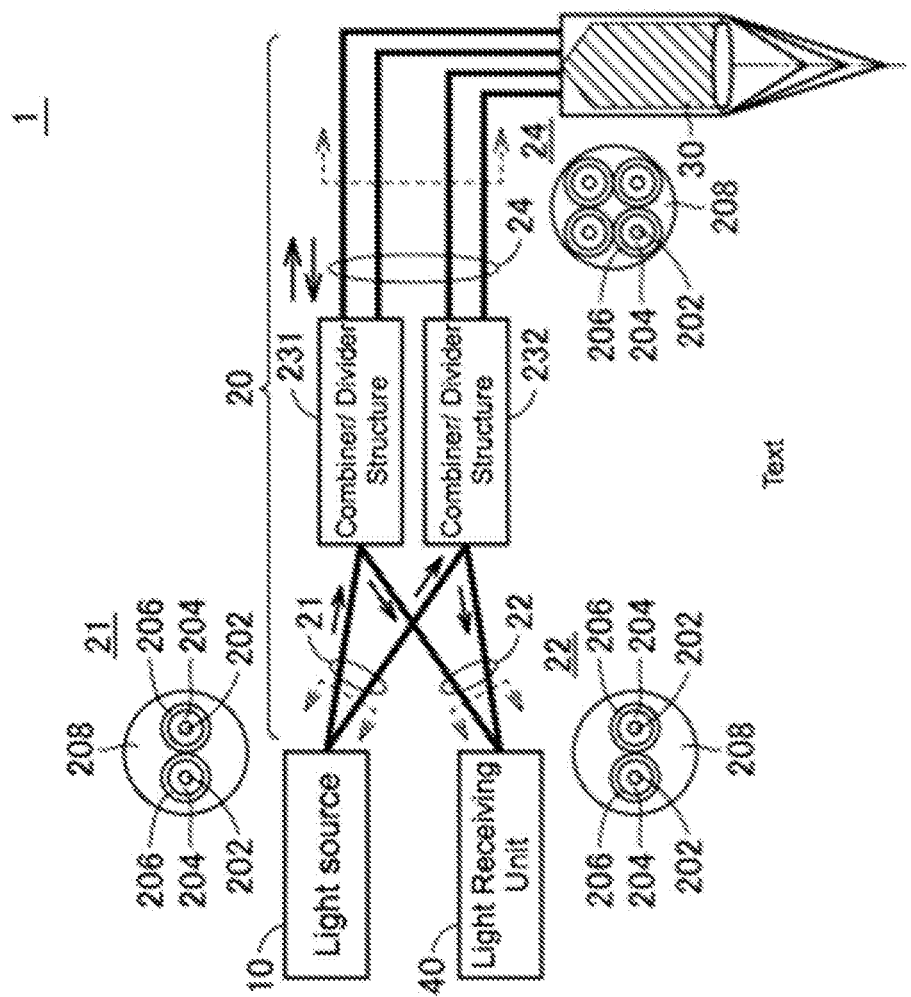

Next is an overview of the parallel arrangement of cores adopted in an optical measurement device according to the embodiment. FIGS. 2A and 2B are schematic views for describing the parallel arrangement of cores adopted in the optical measurement device according to the embodiment. FIG. 2A is a schematic view of the configuration of the light guide in an optical measurement device 1A in the related art; FIG. 2B is a schematic view of the configuration of the light guide in the optical measurement device 1 according to the embodiment.

Referring to FIG. 2A, the optical measurement device 1A includes an input cable 21A optically coupled to the light source 10, an output cable 22A optically coupled to the light receiving unit 40, and a sensor head cable 24A optically coupled to the sensor head 30; the input cable 21A, output cable 22A, and sensor head cable 24A serve as the light guide 20A. The ends of the input cable 21A and the output cable 22A are optically coupled through a combiner/divider type coupler 23A. The coupler 23A is 2×1 star coupler (with two inputs to one output or one input to two outputs) which is equivalent to a Y-splitter; in addition to transmitting the light entering from the input cable 21A to the sensor head cable 24A, the coupler 23A splits the light entering from the sensor head cable 24A and transmits the light to the input cable 21A and the output cable 22A.

The input cable 21A, output cable 22A, and sensor head cable 24A are all optical fibers containing a single core 202; in cross section, the core 202 is sheathed in a cladding 204, a coating 206, and an exterior jacket 208 in that order outwards.

In contrast, as illustrated in FIG. 2B, the optical fibers used in the light guide 20 in the optical measurement device 1 according to the embodiment include a plurality of cores. More specifically, the optical measurement device 1 includes an input cable 21 optically coupled to the light source 10, an output cable 22 optically coupled to the light receiving unit 40, and a sensor head cable 24 optically coupled to the sensor head 30, where the input cable 21, output cable 22, and sensor head cable 24 serve as the light guide 20. The optical fibers making up the light guide 20 in the optical measurement device 1 according to the embodiment may be a single mode fiber or a multi-mode fiber.

As an example, the optical fiber used for the input cable 21 and for the output cable 22 contains two cores. The input cable 21 optically couples the combiner/divider type couplers 231, 232 to the light source 10. Similarly, the output cable 22 optically couples the combiner/divider type couplers 231, 232 to the light receiving unit 40. Both couplers 231, 232 are 2×2 star couplers (i.e., two-port couplers with two inputs and two outputs).

The sensor head cable 24 is an optical fiber containing four cores, and optically couples the ends of the couplers 231, 232 to the sensor head 30.

In addition to transmitting the light entering from the one of the cores in the input cable 21 to two of the cores in the sensor head cable 24, the coupler 231 mixes the light entering from two of the cores in the sensor head cable 24, and further splits and transmits the light to the input cable 21 and the output cable 22. Similarly, the coupler 232 transmits the light entering from the other core in the input cable 21 to the both cores in the sensor head cable 24, mixes the light entering from the two other cores in the sensor head cable 24, and further splits and transmits the light to the input cable 21 and the output cable 22.

Both the input cable 21 and the output cable 22 are optical fibers containing two cores 202, where in cross section, a core 202 is sheathed with cladding 204, coating 206 as part of a set of two which are then surrounded with an exterior jacket 208. On the other hand, the sensor head cable 24 is an optical fiber containing four cores 202, where in cross section, a core 202 is sheathed with cladding 204 and coating 206 as part of a set of four which are then surrounded with an exterior 208.

As illustrated in FIG. 2B, in this embodiment, the optical path from the light source 10 to the sensor head 30, and the optical path from the sensor head 30 to the light receiving unit 40 uses a plurality of cores. The plurality of cores in the optical path increases the light intensity of the light reflecting from the measurement object 2 without adversely affecting measurement performance, since there is no enlargement of the core diameters themselves. It is assumed that in this embodiment, the etendue from the light source 10 is greater than the etendue from the optical fiber.

FIG. 2B provides an example of the input cable 21 and the output cable 22 as optical fibers with two cores, and the sensor head cable 24 as an optical fiber with four cores; however, the implementation of the cables is not limited to such, and optical fibers with a greater number of cores may be used.

C. Device Structure

Figure 3:
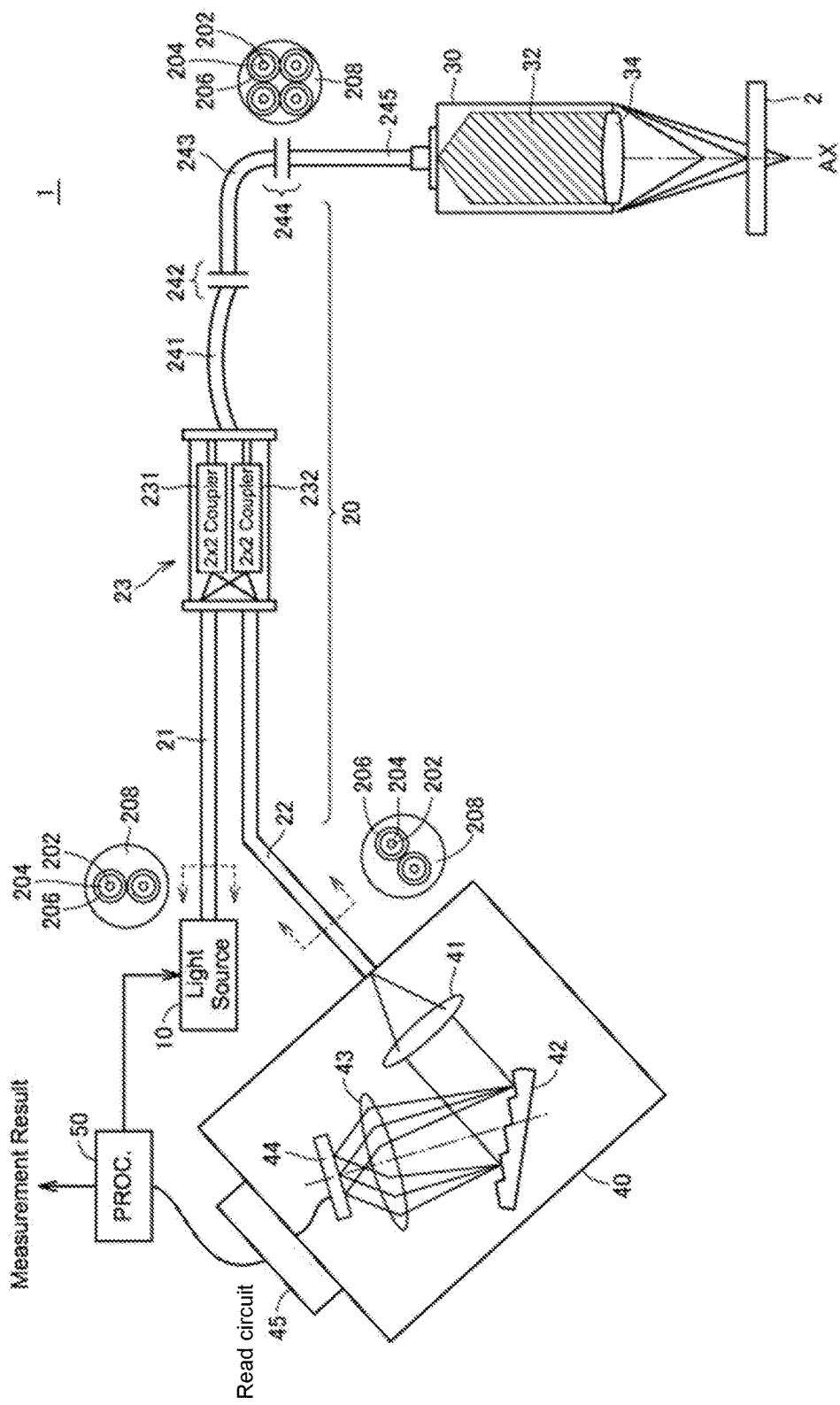
FIG. 3 is a schematic view of the optical measurement device according to the embodiment.

Next is described one example of the structure of the optical measurement device 1 according to a first embodiment. FIG. 3 is a schematic view illustrating the optical measurement device according to the first embodiment.

Referring to FIG. 3, the optical measurement device 1 according to the embodiment includes a light source 10, a light guide 20, a sensor head 30, a light receiving unit 40, and a processor 50.

The light source 10 emits illumination light containing a plurality of optical wavelength components, and is typically implemented using a white-light light emitting diode (LED). Any desired kind of light source may be used, so long as the light source is capable of radiating light possessing a range of wavelengths where the displacement width of all the focal positions generated through the axial chromatic aberration covers the required measurement range.

The sensor head 30 contains a chromatic aberration unit 32 and the objective 34; the sensor head 30 is equivalent to an optical system that induces an axial chromatic aberration in light radiating from the light source 10 and receives light reflecting from the object 2 with at least a portion thereof arranged on a line extending from the optical axis.

The light receiving unit 40 includes a spectrometer 42, and a detector 44; the spectrometer 42 separates the light reflecting from the object and received at the optical system, i.e., the sensor head 30 into each wavelength component; the detector 44 includes a plurality of light receiving elements arranged corresponding to the dispersion direction from the spectrometer 42. The spectrometer 42 is typically a diffraction grating, however any desired device may be adopted therefor. The detector 44 may be a line sensor (one-dimensional sensor) with a plurality of light receiving elements arranged one-dimensionally to correspond with the dispersion direction from the spectrometer 42. The detector 44 may also be an image sensor (two-dimensional sensor) where the light receiving elements are arranged two-dimensionally on the detection surface. Implementations of the detector 44 as a one-dimensional sensor and as a two-dimensional sensor are described hereafter in detail.

In addition to the spectrometer 42 and the detector 44, the light receiving unit 40 includes a collimating lens 41 that collimates reflection light emitted from the output cable 22, and a read circuit 45 for outputting the results from the detector 44 to the processor 50. Furthermore, reduction optics 43 may also be provided as necessary for modifying the spot size of reflection light separated into wavelengths by the spectrometer 42.

Figure 4:
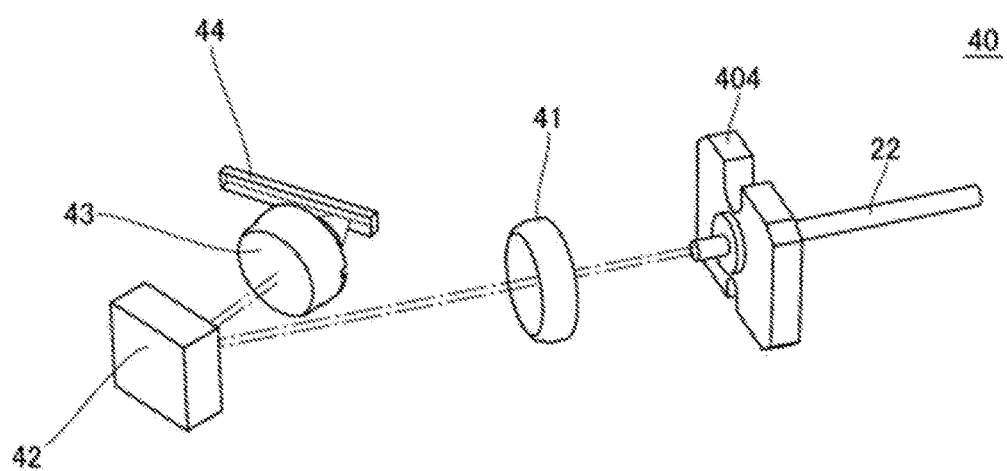
FIG. 4 is a schematic view illustrating a layout of the light receiving unit in the optical measurement device according to the embodiment.

FIG. 4 is a schematic view illustrating a layout of the light receiving unit 40 in the optical measurement device 1 according to the embodiment. Referring to FIG. 4, the light receiving unit 40 includes a cable fastener 404 for securing the output cable 22. The cable fastener 404 is installed on a substrate (not shown) on which the components in the light receiving unit 40 are arranged. The collimating lens 41 and the spectrometer 42 are secured along the optical axis of the end surface of the output cable 22. The detector 44 is aligned with and disposed along the dispersion direction of the spectrometer 42, with reduction optics 43 arranged on the optical path between the spectrometer 42 and the detector 44.

The light receiving unit 40 can be made more compact by using the spectrometer 42 to differentiate the input side and the output side (i.e., after separation) of the optical axis.

The processor 50 computes the distance between the sensor head 30 and the object 2 on the basis of the detection values from each of the light receiving elements in the light receiving unit 40.

As described above, in the optical measurement device 1 according to this embodiment, the sensor head 30 and light receiving unit 40 are optically connected via the light guide 20 which includes a plurality of cores. As an example, in FIG. 3, the input cable 21 and the output cable 22 are optical fibers that contain two cores, and the sensor head cable is an optical fiber containing four cores. However, so long as there are multiple cores in the optical fiber making up each of the cables, the number of cores is not limited.

FIG. 3 illustrates a sensor head cable with a plurality of cables connected in series; this arrangement is for improving usability. That is, the sensor head cable in this example contains three cables 241, 243, 245 which each include a plurality of cores. A multicore connector 242 is inserted between the cable 241 and the cable 243 to optically connect the cables, and another multicore connector 244 is inserted between the cable 243 and the cable 245 to optically connect the cables.

Note that it is preferable to adopt a bundle fiber including a plurality of cores to serve as a cable; a plurality of core and clad sets is tied together and integrated into a bundle fiber.

The light guide 20 contains a combiner/divider 23 for optically coupling the input cable 21 and output cable 22 with the sensor head cable. The combiner/divider 23 is a 2×2 star coupler (i.e., a two-port coupler, with two inputs and two outputs) containing two couplers 231, 232. The functions of the combiner/divider 23 were already described with reference to FIGS. 2A and 2B, and thus the description is not repeated here.

By adopting a plurality of cores in this manner, the optical measurement device 1 according to the embodiment increases the amount of light illuminating, and reflecting from the object 2. Additionally, the combiner/divider serving as the coupler makes it possible to split the light within the light guide 20, and allows a single detector 44 to receive the light reflecting from the object 2 (measurement light) and propagating through the plurality of cores.

The configurations for a one-dimensional sensor (the so-called line sensor for a two-dimensional sensor are now described as examples.

D. One-Dimensional Sensor: Detector Configuration and Structure

Next, a configuration and a process where the detector 44 is a one-dimensional sensor (line sensor) are described.

Figure 5A:
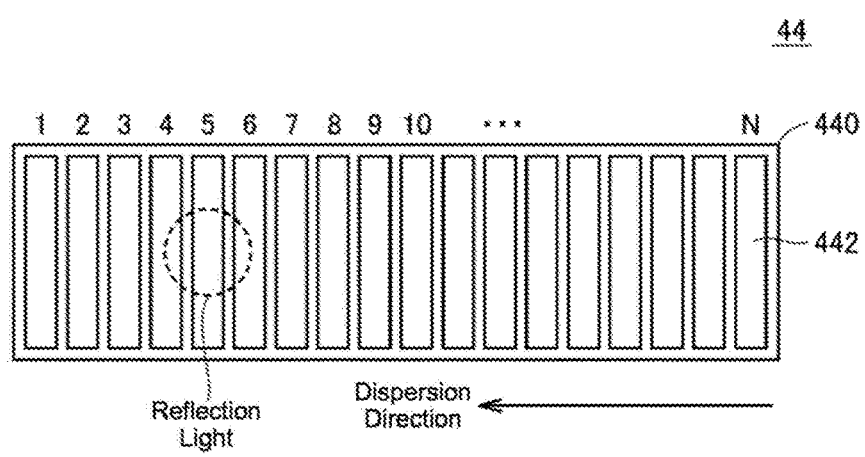
FIGS. 5A and 5B are schematic views for describing a detector 44 implemented as a line sensor in the optical measurement device according to the embodiment.
Figure 5B:
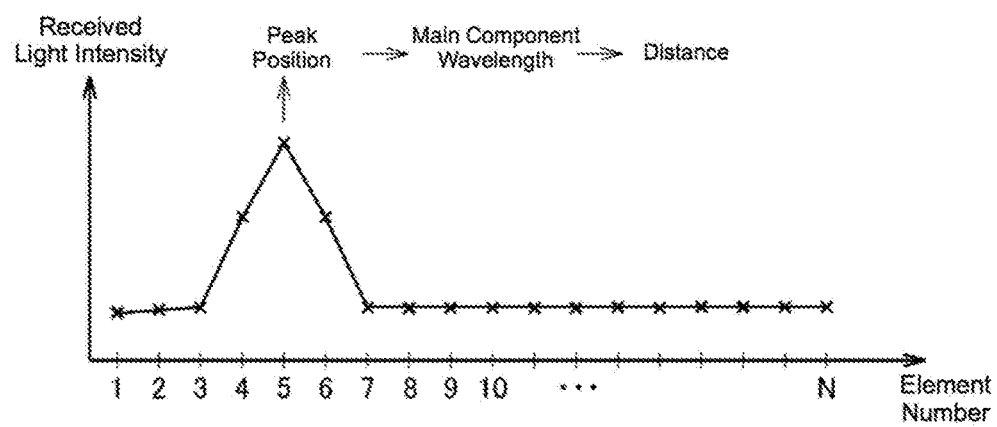

FIGS. 5A and 5B are schematic views for describing a detector 44 implemented as a line sensor in the optical measurement device 1 according to the embodiment. Referring to FIG. 5A, the line sensor 440 includes a plurality of light receiving element 442 arranged one-dimensionally to correspond to the dispersion direction from the spectrometer 42 (FIG. 3). The dispersion direction from the spectrometer 42 means the direction connecting to the image-forming positions of light with a plurality of wavelength components (or, frequency components). Accordingly, there is a mapping between the element number assigned to a light receiving element, and the wavelengths that could be included in the reflection light received at the light receiving unit 40.

However, there is no need for the arrangement direction of the plurality of light receiving elements 442 and the dispersion direction from the spectrometer 42 to be identical, so long as there is a way to distinguish between components with different wavelengths. In other words, the light receiving elements are configured so that when light of a certain wavelength component enters a certain light receiving element 442, light having a different wavelength component enters a different light receiving element 442.

The plurality of light receiving elements 442 are mutually independent detection devices, where each light receiving element outputs a signal corresponding to the light intensity of the light received (that is, indicating the magnitude of the amount of light received, or indicating the light intensity of the light received). FIG. 5B depicts one example of the detection result when a spot of reflection light enters a designated area on the line sensor 440 as illustrated in FIG. 5A. As illustrated in FIG. 5A, the spot of reflection light falls on three light receiving elements with element numbers 4, 5, 6; therefore these light receiving elements output a signal indicating a light intensity for the light received that is above noise level.

The processor 50 (FIG. 3) identifies the peak position of the light intensity of the light received on the basis of a received light intensity profile such as the one illustrated in FIG. 5B. The processor 50 then identifies the main component of the wavelengths included in the reflection light from the wavelength corresponding to the aforementioned peak position, and computes the distance (displacement) from the sensor head 30 to the object 2 using the main component wavelength.

Given that an optical measurement device 1 according to the embodiment adopts a light guide 20 having a plurality of cores, the number of beams of reflection light entering the light receiving unit 40 corresponds to the number of cores. Therefore, it is necessary to appropriately detect the wavelength components containing the plurality of beams.

When using a one-dimensional sensor (line sensor) as the detector 44, the light guide 20 and the light receiving unit 40 are configured so that when a first light beam of a wavelength $\lambda 1$ is provided from the sensor head 30 to a first core among the plurality of cores, the light receiving elements in the detector 44 at which said first light beam enters is the same as at least a portion of the light receiving elements in the detector 44 at which a second light beam of the wavelength $\lambda 1$ enters when the second light beam is provided from the sensor head 30 to a second core among the plurality of cores. This configuration is described with reference to FIGS. 6A, 6B, and 7.

Figure 6A:
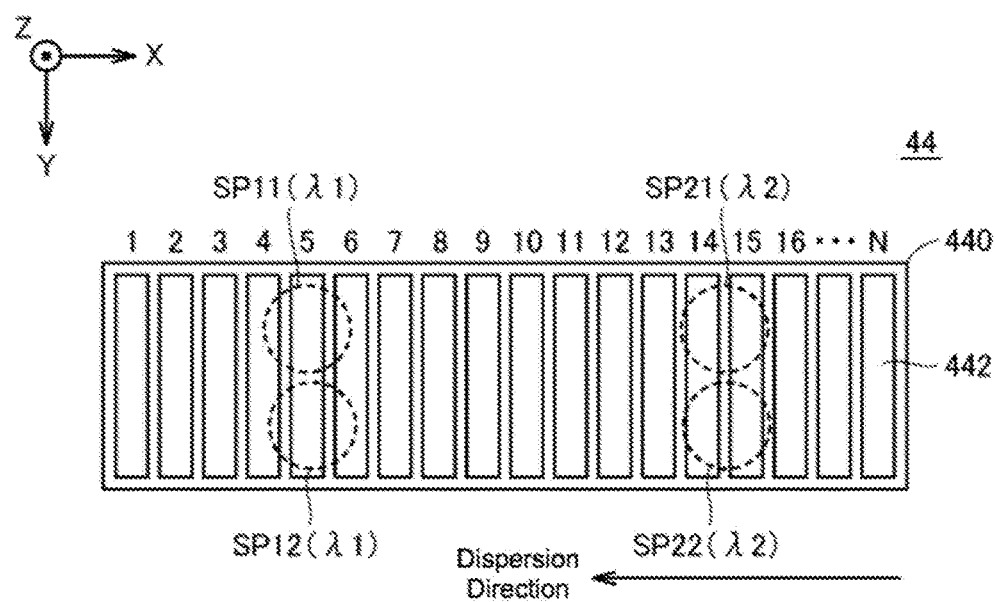
FIGS. 6A and 6B are schematic views for describing the detection of reflected light when the detector in an optical measurement device according to the embodiment is implemented as a one-dimensional sensor.
Figure 6B:
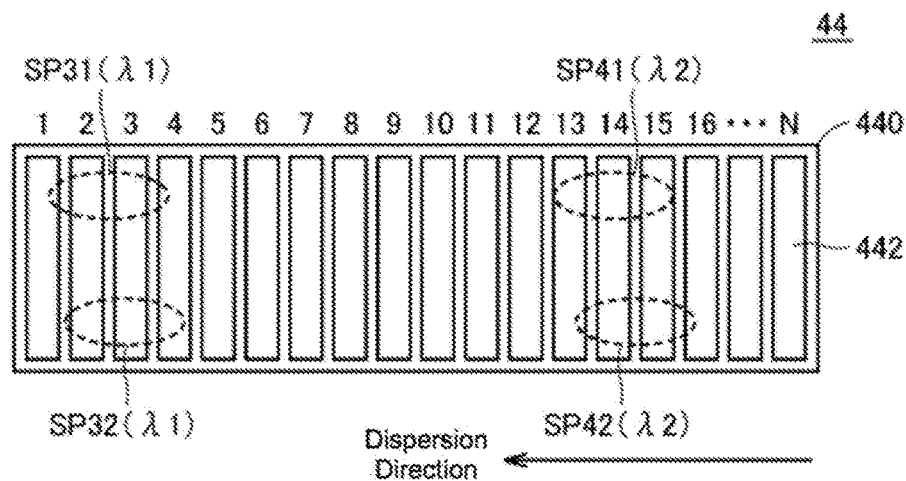

FIGS. 6A and 6B are schematic views for describing the detection of reflection light when a one-dimensional sensor is used as the detector in an optical measurement device 1 according to the embodiment. In FIGS. 6A and 6B, the X axis direction is taken as the direction along which the light receiving elements 442 are arranged one-dimensionally; the Y axis direction, orthogonal to the X axis direction is taken as the width direction of the light receiving elements 442; and, the detection surface of the detector 44 is the surface along which the light receiving elements 442 are arranged with the Z axis direction taken as the vertical direction from said detection surface. Unless otherwise stated, these definitions are the same in the description below.

FIG. 6A depicts an example of the two spots SP11 and SP12 that are generated on the detector 44 when light of a wavelength $\lambda 1$ is provided to the two cores (FIG. 3) in the light guide 20 (i.e., the output cable 22). FIG. 6A also depicts an example of the two spots SP21 and SP22 generated on the detector 44 when light of a wavelength $\lambda 2$ is provided to the aforementioned two cores.

For the sake of convenience, although two different spots of wavelength $\lambda 1$ and $\lambda 2$ are provided on the same drawings (FIG. 6A and FIG. 6B), typically only a specific wavelength component enters the detector 44 during measurement.

First, turning attention to the spot SP11 and the spot SP12 which correspond to the wavelength $\lambda 1$, the spot SP11 spans three light receiving elements, i.e., elements 4, 5, 6 in the line sensor 440; the spot SP12 also spans the three light receiving elements, elements 4, 5 6 in the line sensor 440.

In contrast, turning attention to the spot SP21 and the spot SP22 which correspond to the wavelength $\lambda 2$, the spot SP21 spans two light receiving elements, i.e., elements 14, 15 in the line sensor 440; and the spot SP12 also spans the two light receiving elements, elements 14, 15 in the line sensor 440.

Although FIG. 6A provides examples of circular spots, the spots may also be elliptical by using the later described reduction optics. FIG. 6B provides an example of how light enters the detector 44 when the spots are elliptical.

Referring to FIG. 6B and looking at the spot SP31 and the spot SP32 which correspond to the wavelength $\lambda 1$, the spot SP31 spans four light receiving elements, specifically elements 1, 2, 3, 4 in the line sensor 440; and the spot SP32 spans the three light receiving elements, elements 2, 3, 4 in the line sensor 440.

In contrast, looking at the spot SP41 and the spot SP42 which correspond to the wavelength $\lambda 2$, the spot SP41 spans three light receiving elements, i.e., elements 13, 14, 15 in the line sensor 440; and the spot SP42 spans the four light receiving elements, elements 13, 14, 15, 16 in the line sensor 440.

Because the displacement is measured on the basis of a received-light-intensity profile (i.e., the variation of the received light intensity on the light receiving elements) from the line sensor 440, so long as spots for the same wavelength, on balance, enter the same light receiving element (or set of light receiving elements), the light use efficiency improves without adversely impacting measurement performance even though the spots corresponding to the same wavelength do not necessarily completely enter the light receiving elements in the illumination state illustrated in FIG. 6B.

Figure 7:
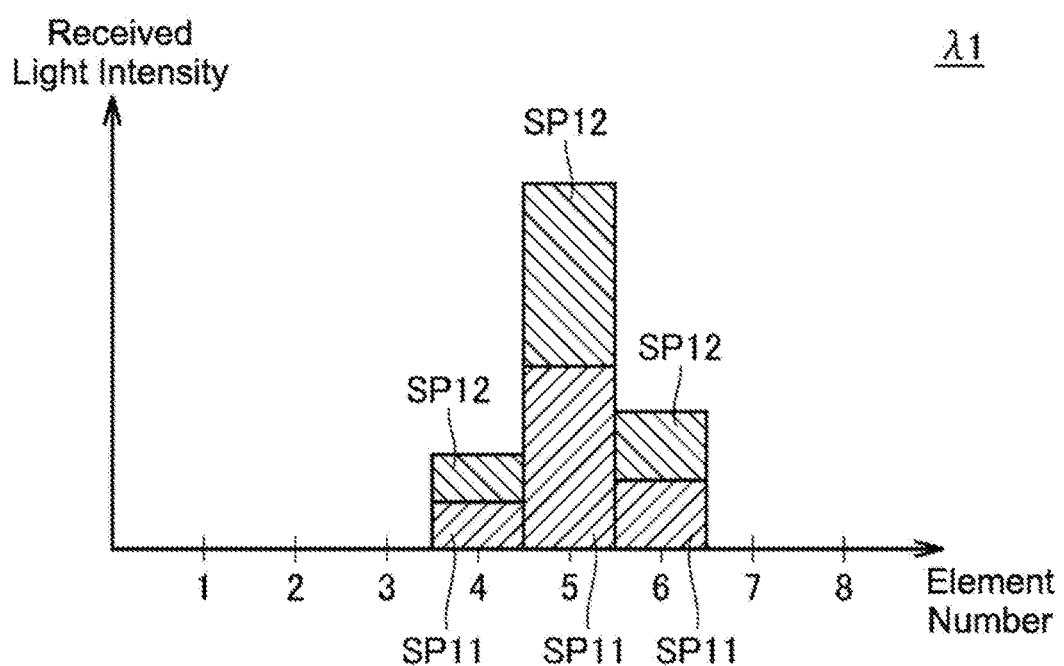
FIG. 7 illustrates the detection results obtained when spots of the first wavelength λ1 in FIG. 6A enters the detector.

FIG. 7 depicts one example of the detection results obtained when spots SP11 and SP12 of the first wavelength $\lambda 1$ illustrated in FIG. 6A enters the detector. For the sake of convenience, dark flow and other forms of noise are not illustrated. Referring to FIG. 7, each of the elements 4, 5, and 6 outputs a light intensity corresponding to the surface area of the spot SP11 and SP12 as a detection value. The total surface area of the spots SP11 and SP12 is output as the detection value.

The width of the significant value output as the detection result in FIG. 7 (three pixels, in the example illustrated in FIG. 7) is not change regardless of whether a plurality of cores are adopted; on the other hand the absolute value of the value output as the detection result increases when a plurality of cores is adopted. The processor 50 collectively acquires the detection values generated when a plurality of light beams radiating from each of the plurality of cores enters a single light receiving element 442. Adopting this kind of configuration does not adversely affect the measurement performance (spectral resolution), and increases the light intensity (that is, increases the signal-to-noise ratio) that can be captured.

In this manner, when light of the same wavelength enters the light receiving unit 40 via each of the cores, the light receiving elements corresponding to the spots generated on the detection surface of the detector 44 share at least a portion of the number and position thereof with each other. In this manner, ensuring that at least a portion of the light receiving elements corresponding to the spots generated from the same wavelength share number and position improves light use efficiency without adversely impacting measurement performance.

In other words, as illustrated in FIGS. 6A and 6B, when the detector 44 is a one-dimensional sensor (line sensor), the light guide 20 and the light receiving unit 40 are configured so that the direction corresponding to a first spot SP11 and a second spot SP12 (generally, the direction along a line connecting the spot SP11 and spot SP12) is mapped to the width direction (i.e., the Y direction) of the light receiving elements 442. Note that here the first spot SP11 is generated on the detection surface of the detector 44 when a first light beam of a wavelength $\lambda 1$ is provided from the sensor head 30 to a first core among the plurality of cores, and the second spot SP12 is generated on the detection surface of the detector 44 when a second light beam of the first wavelength $\lambda 1$ is provided from the sensor head 30 to a second core among the plurality of cores.

This configuration is implemented by arranging the part of the light guide 20 which is optically connected to the light receiving unit 40 (i.e., output cable 22) so that the alignment direction of the plurality of cores contained therein (refer to cross-sections illustrated in FIG. 3) maps to a direction orthogonal to the arrangement direction of the plurality of light receiving elements 442 (FIG. 4).

Alternatively this configuration for the light guide 20 and the light receiving unit 40 may be implemented so that there is a mapping between the direction along a line connecting the center of a plurality of cores 202 (FIG. 3) in the output cable 22 and the width direction of the light receiving elements 442 (i.e., the Y axis direction).

The positioning of mainly three components, namely, the end surface of the output cable 22, the spectrometer 42, and the detector 44 may be adjusted as appropriate to implement the above-described configuration. For example, positioning of the components may proceed as follows: the spectrometer 42 may be secured at a predetermined position relative to the light receiving unit 40, while adjusting the position of the end surface of the output cable 22 on the input side and the position of the detector 44 on the output side with reference to the position of the spectrometer 42.

E. Two-Dimensional (CMOS Image) Sensor: Detector Configuration and Processing

Next, configuration and processing when the detector 44 is a two-dimensional sensor (complementary metal oxide semiconductor: CMOS image sensor) is described.

Figure 8:
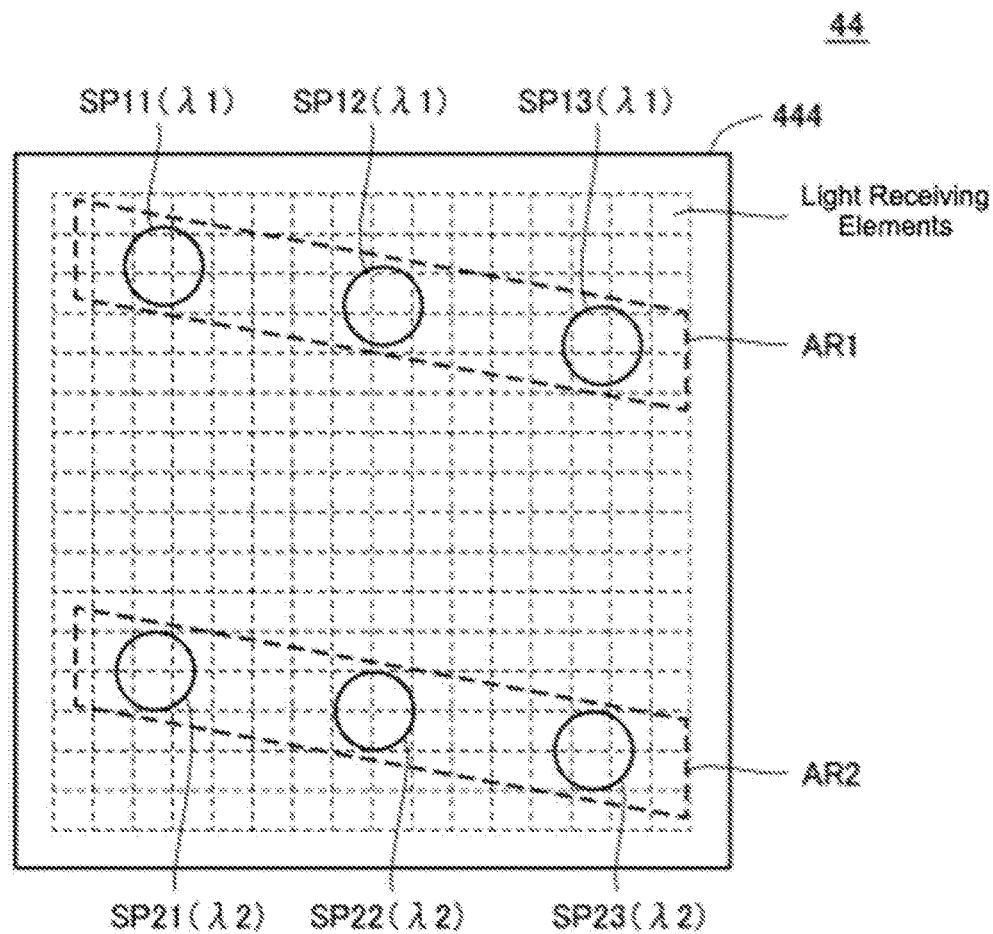
FIG. 8 is a schematic view for describing a detector implemented using a two-dimensional sensor (e.g., a complementary metal oxide semiconductor: CMOS image sensor) in an optical measurement device according to an embodiment.

FIG. 8 is a schematic view for describing a detector 44 implemented using a two-dimensional sensor (e.g., a CMOS image sensor) in the optical measurement device 1 according to the embodiment. Referring to FIG. 8, the CMOS image sensor 444 includes a plurality of light receiving elements arranged two dimensionally on a detection surface.

Given the principle behind CMOS sensors, the CMOS image sensor 444 only allows for local read out. Therefore, while it is preferable for either the rows or columns of the CMOS image sensor 444 to correspond to the dispersion direction of the spectrometer 42 (FIG. 3), implementing the following control logic allows the CMOS image sensor 444 to be positioned along a desired direction.

Assume the light guide 20 includes three cores (in the output cable 22). FIG. 8 depicts an example of three spots SP11, SP12, SP13 that are generated on the detector 44 when light of a wavelength $\lambda 1$ is provided to the cores. FIG. 8 also depicts an example of three spots SP21, SP22, SP23 generated on the detector 44 when light of a wavelength $\lambda 2$ is provided to the aforementioned three cores. For the sake of convenience, although six different spots of the wavelength $\lambda 1$ and $\lambda 2$ are provided on the same drawing in FIG. 8, typically only a specific wavelength component enters the detector 44 during measurement.

The spectrometer 42 diffracts the light entering thereinto at regular intervals in accordance with the wavelength of the light, therefore, selectively determining the area on the CMOS image sensor 444 from which image information is read (hereafter, also the "read area") on the basis of these regular intervals allows the selection of a wavelength included in the reflection light irradiating the detector.

For instance, as illustrated in FIG. 8, the position and range of the three spots SP11, SP12, SP13 generated on the detector 44 when each of the three cores in the light guide 20 is provided with light of a wavelength $\lambda 1$ may be used to select the read area AR1 which may be used to detect the wavelength $\lambda 1$. Similarly, the position and range of the three spots SP21, SP22, SP23 generated on the detector 44 when each of the three cores in the light guide 20 is provided with light of a wavelength $\lambda 2$ may be used to select the read area AR2 which may be used to detect the wavelength $\lambda 2$.

A read area that allows detection of a given wavelength can be determined for all wavelengths. This makes it possible to identify the main component wavelength in the reflection light (measurement light) when given a plurality of wavelengths. When the detector 44 is a two-dimensional sensor implemented in this manner, the processor 50 estimates the area suitable for detecting each wavelength on the basis of an intensity distribution generated by the spots of light of the same wavelength radiating from a plurality of cores entering on the detection surface of the detector 44. An area suitable for detection may be estimated through various kinds of statistical methods such as extrapolation or interpolation.

Figure 9:
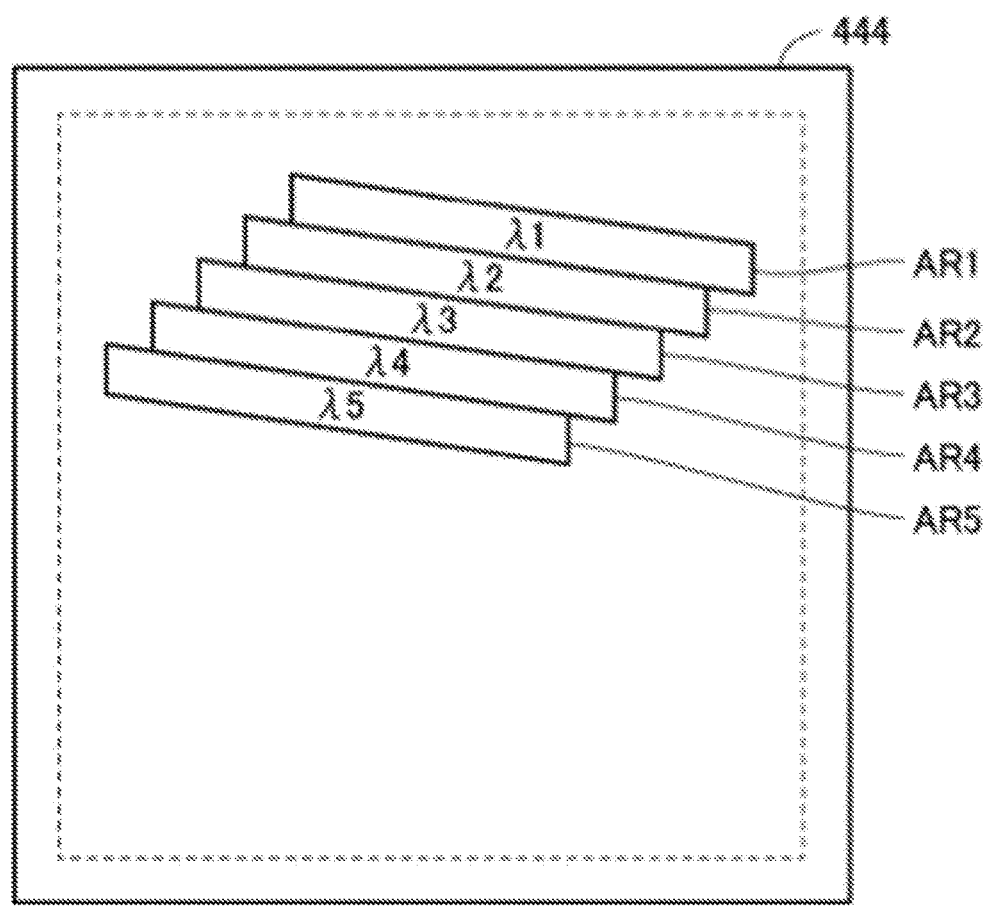
FIG. 9 depicts one example of a read area established on a detector implemented using a two-dimensional sensor in the optical measurement device according to an embodiment.

FIG. 9 depicts one example of the read areas designated on the detector 44, which is implemented using a two-dimensional sensor in the optical measurement device 1 according to the embodiment. As illustrated in FIG. 9, a read area for detecting a given wavelength may be established in accordance with the wavelength of each of the spots irradiating the detection surface of the CMOS image sensor 444. That is, the processor 50 selects a sub-region from the detection surface of the detector 44 to use in detecting each of the wavelengths configured to be included in the reflection light. The processor 50 stores a map in advance of each of the read areas, similar to those depicted in FIG. 9. The processor 50 selectively reads the received light intensity from the CMOS image sensor 444. Using the received light intensity, the processor 50 identifies the main component included in the reflection light (measurement light) incident on the detector.

Figure 10A:
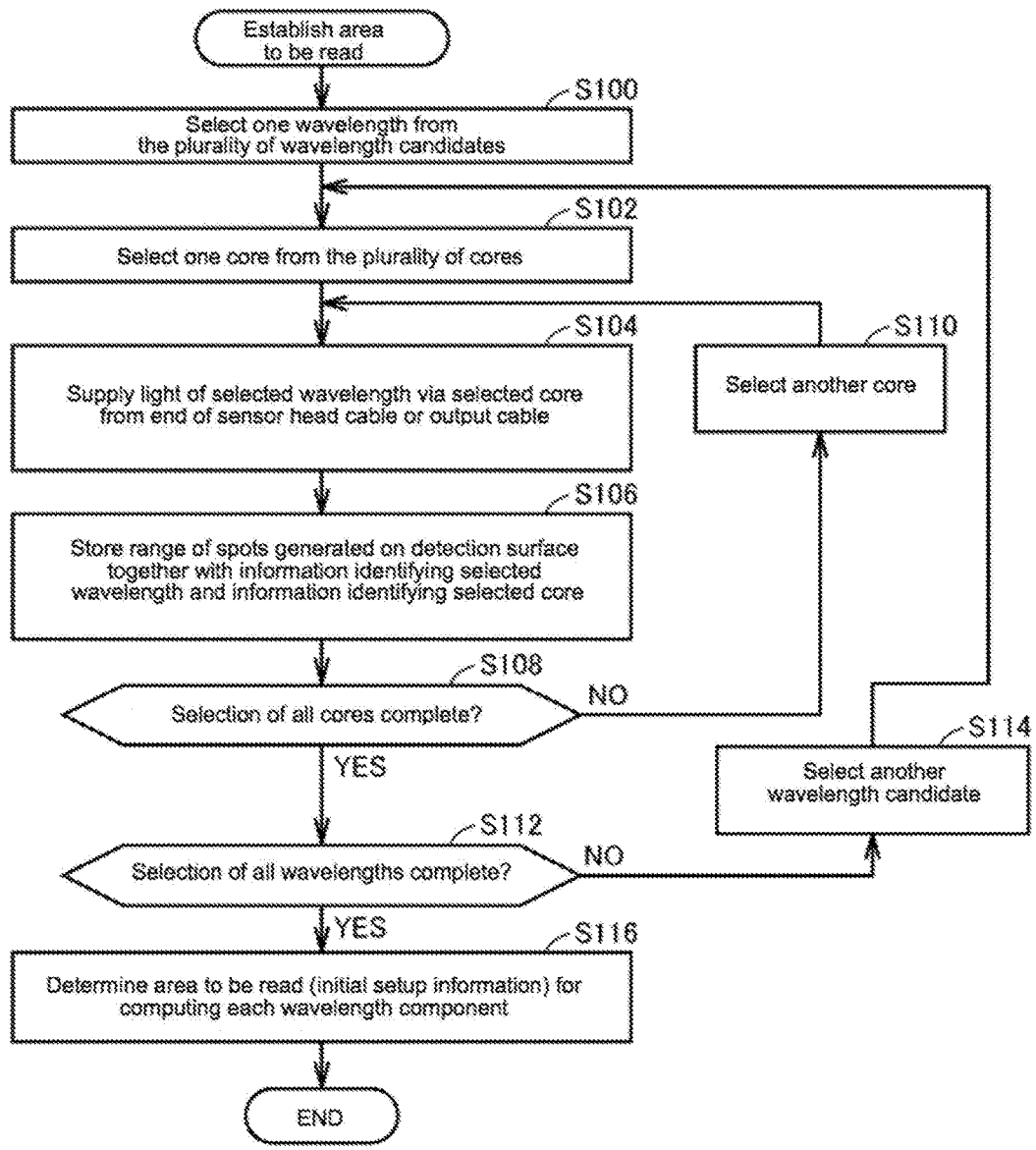
FIGS. 10A and 10B are flowcharts of the processes of measurement with a detector implemented as a two-dimensional sensor in the optical measurement device according to an embodiment.
Figure 10B:
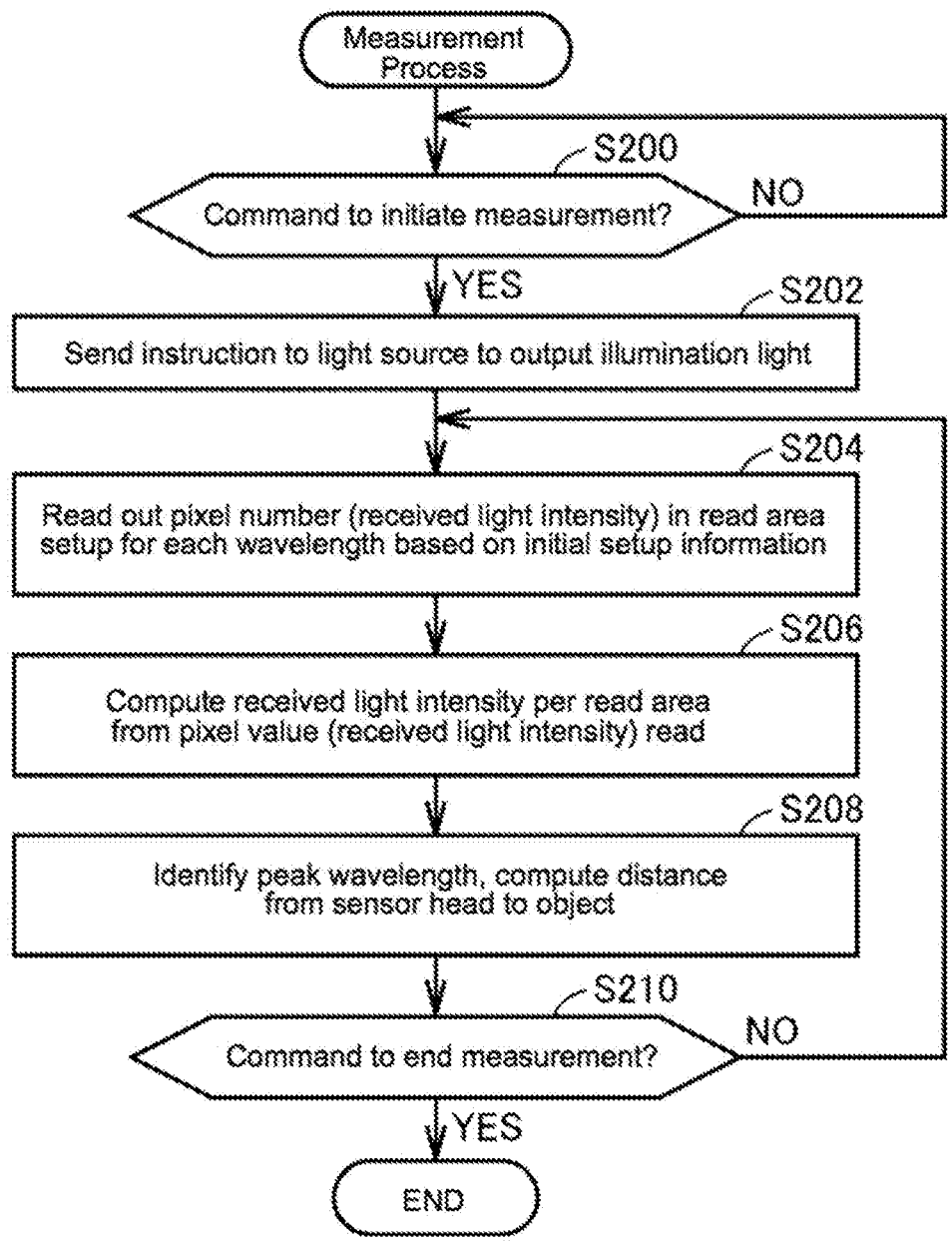

FIGS. 10A and 10B are flowcharts illustrating the process of measurement with a detector implemented as a two-dimensional sensor in the optical measurement device 1 according to an embodiment. FIG. 10A illustrates the process of designating the kind of read areas illustrated in FIG. 9; and FIG. 10B illustrates the process of measurement on the basis of the kind of read areas illustrated in FIG. 9.

Referring FIG. 10A, first, one of a plurality of wavelengths is selected from among a plurality of wavelength candidates (step S100), and a single core is selected from the plurality of cores (step S102). Light of the selected wavelength is provided from the end of the sensor head cable 24 or the output cable 22 via the selected core (step S104). The processor 50 maps and stores the range of spots (or, the received-light intensity profile) generated on the detection surface of the detector 44 together with information identifying the selected wavelength, and information identifying the selected core (step S106).

If unselected cores remain among the plurality of cores (NO, at step S108), a different core is selected from the plurality of unselected cores (step S110) and processing repeats from step S104.

Whereas, if selection of all the plurality of cores is complete (YES, at step S108), and unselected wavelengths remain among the plurality of wavelengths candidates (NO, at step S112), a different wavelength is selected from the plurality of unselected wavelength candidates (step S114). Processing then repeats from step S102.

If selection of all the plurality of wavelength candidates is complete (YES, step S112), the processor 50 uses the detection results from CMOS image sensor 444 to determine the read area (initial setup information) on the basis of the information stored at step S106 for computing each of the wavelength components (step S116). The process for establishing the read area then terminates.

Referring to FIG. 10B, once instructed to start measurement (YES, at step S200), the processor 50 instructs the light source 10 to generate illumination light (step S202).

For each predetermined measurement cycle, the processor 50 reads the pixel values (received light intensity) within the read area designated for each wavelength on the basis of the initial setup information (step S204). The processor 50 computes a sum (or an average) for the pixel values (received light intensities) read from each read area, and computes the received light intensity (step S206). The processor 50 identifies the peak wavelength from the received light intensities calculated for each wavelength, and computes the distance from the sensor head 30 to the object 2 using the identified peak wavelength (step S208).

If there is no instruction to terminate the measurement process (NO, at step S210), processing repeats from step S204.

In this manner, the processor 50 in the optical measurement device 1 according to the embodiment computes the distance using the detection values from the plurality of light receiving elements in the light receiving unit on the basis of the positional relationship between a first area on the detection surface (the spot SP11 in FIG. 8) where a first light beam of a wavelength $\lambda 1$ enters when the first light beam is provided from the sensor head 30 to a first core among the plurality of cores making up the light guide 20 and a second area on the detection surface (the spot SP12, SP13 in FIG. 8) where a second light beam of the first wavelength $\lambda 1$ enters when the second light beam is provided from the sensor head 30 to a second core among the plurality of cores.

More specifically, each of the read areas on the detection surface of the CMOS image sensor 444 is established on the basis of the positional relationship between the spots.

However, the read areas on the detection surface of the CMOS image sensor 444 may be determined from the weighted coefficients used in calculating the received light intensity for the wavelengths, instead of selecting the read areas in accordance with the wavelengths reflecting from the measurement object as illustrated in FIG. 9. For instance, for a given point (x, y) on the detection surface of the CMOS image sensor 444, a weighted coefficient $f(\lambda n, x, y)$ is calculated for each element in the set of wavelengths $\lambda n$ ($\lambda 1$, $\lambda 2$, ..., $\lambda N$), and a weighted average calculated for a given detection result $P(x, y)$ from the CMOS image sensor 444 using the weighted coefficient f, to thereby compute the intensity for each of the wavelength components.

In other words, the positional relationship, such as where a spot corresponding to a given wavelength will be incident is known. Therefore, any desired post-processing techniques may be adopted via statistical processing that makes use of this known information.

Note that local read out is not necessarily required; the received light intensity (image information) contained in the light receiving elements in the CMOS image sensor 444 may be read out all together while using only the information from the required read area. In this case, the same processes may be implemented using a CCD image sensor which reads out information globally.

F. Two-Dimensional (CCD Image) Sensor: Detector Configuration and Processing

Next, the configuration and processes when the detector 44 is implemented using a two-dimensional sensor (charge-coupled device: CCD image sensor) is described.

Figure 11:
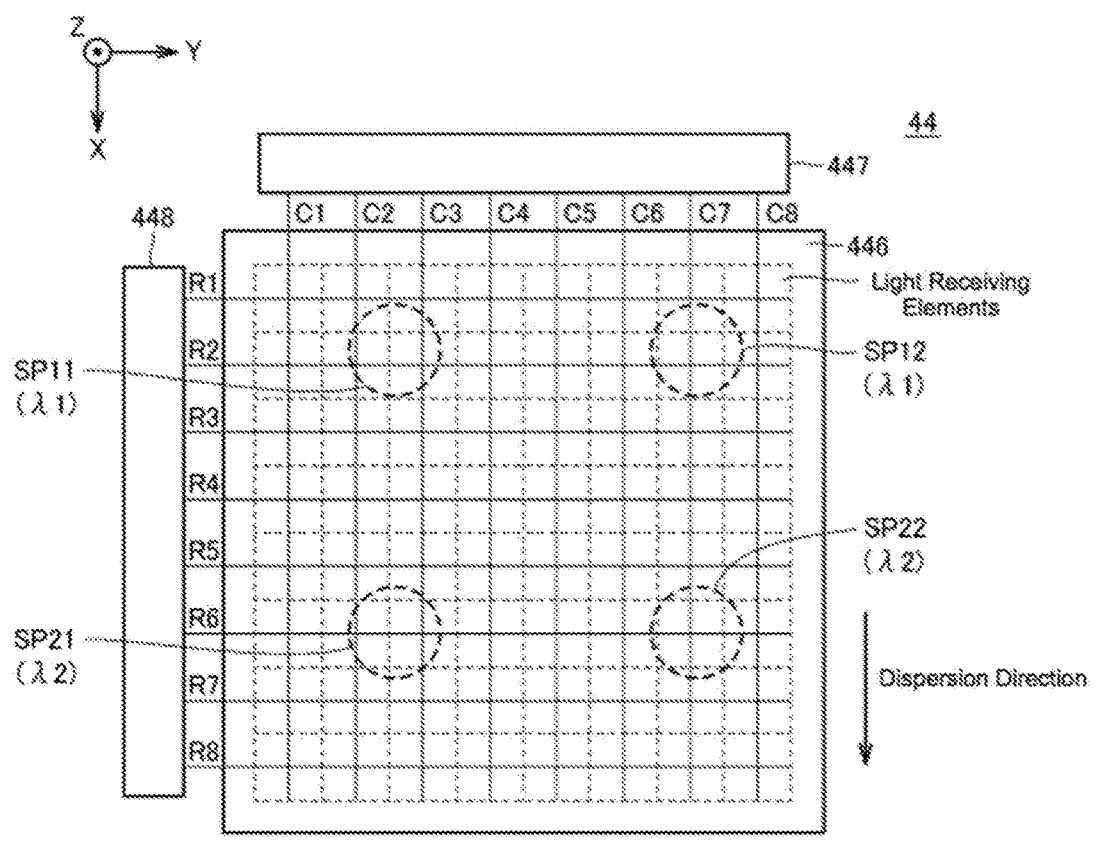
FIG. 11 is a schematic view for describing a detector implemented using a two-dimensional sensor (e.g., a charge-coupled device: CCD image sensor) in an optical measurement device according to an embodiment.

FIG. 11 is a schematic view for describing a detector 44 implemented using a two-dimensional sensor (a CCD image sensor) in the optical measurement device 1 according to an embodiment. Referring to FIG. 11, the CCD image sensor 446 includes a plurality of light receiving elements arranged two-dimensionally on a detection surface. The rows or columns of the CCD image sensor 446 are arranged to correspond to the dispersion direction of the spectrometer 42 (FIG. 3).

FIG. 11 depicts an example of the two spots SP11 and SP12 that are generated on the detector 44 when light of a wavelength $\lambda 1$ is provided to the two cores (FIG. 3) in the light guide 20 (i.e., the output cable 22). FIG. 11 also depicts an example of the two spots SP21 and SP22 that are generated on the detector 44 when light of a wavelength $\lambda 2$ is provided to the two cores in the light guide 20 (i.e., the output cable 22). For the sake of convenience, although two different spots of the wavelength $\lambda 1$ and $\lambda 2$ are provided on the same drawing in FIG. 11, typically only a specific wavelength component enters the detector 44 during measurement.

The peripheral circuitry 447, 448 arranged around the CCD image sensor 446 reads the image information from a plurality of light receiving elements on a selected line all at once. Therefore, in addition to ensuring that the row or column direction of the image sensor 446 corresponds to the dispersion direction of the spectrometer, reading out from the CCD image sensor 446 can be treated identically to reading out from a line sensor (i.e., a one-dimensional sensor) as described above. That is, the image sensor 446 is preferably configured so that when a first light beam of a wavelength $\lambda 1$ is provided from the sensor head 30 to a first core among the plurality of cores, the light receiving elements in the detector 44 at which said first light beam enters is the same as at least a portion of the light receiving elements in the detector 44 at which a second light beam of the wavelength λ1 enters when the second light beam is provided from the sensor head 30 to a second core among the plurality of cores. The same occurs for other wavelengths.

In the example illustrated in FIG. 11, looking at the spot SP11 and the spot SP12, the spot SP11 falls on four light receiving elements at intersections corresponding to row numbers R1 and R2, and column numbers C2 and C3. The spot SP12 falls on six light receiving elements at intersections corresponding to row numbers R1 and R2, and column numbers C6, C7, and C8. In this manner, both the spot SP11 and the spot SP12 generated due to the wavelength λ1 are configured to enter the light receiving elements that can be read all at once by selecting the row numbers R1 and R2.

In contrast, looking at the spot SP21 and the spot SP22 corresponding to the wavelength λ2, the spot SP21 falls on six light receiving elements at intersections corresponding to row numbers R5, R6, and R7, and column numbers C2 and C3. The spot SP22 falls on five light receiving elements at intersections corresponding to row numbers R1 and R2, and column numbers C6, C7, and C8. In this manner, both the spot SP21 and the spot SP22 generated due to the wavelength λ2 are configured to enter the light receiving elements that can be read all at once by selecting the row numbers R5, R6, R7.

In this manner, when light of the same wavelength enters the light receiving unit 40 via each of the cores, the light receiving elements corresponding to the spots generated on the detection surface of the detector 44 share at least a portion of the number and column positions (or row positions) thereof with each other. In this manner, ensuring that at least a portion of the light receiving elements corresponding to the spots generated from the same wavelength share number and position improves light use efficiency without adversely impacting measurement performance.

Given that all other configuration and processing are identical to the case where a one-dimensional sensor (line sensor) is adopted as the detector 44 as described above, a detailed description thereof is not repeated.

G. Reduction Optics

Next, the reduction optics 43 adopted in the light receiving unit 40 is described. An optical measurement device 1 according to the embodiment adopts a light guide 20 having a plurality of cores; therefore the object 2 is irradiated with a plurality of spots with a beam of reflection light generated in correspondence to a given spot. The plurality of beams of reflection light (e.g., the spots SP11 and SP12 in FIG. 6A) can be measured as is while relying on the diameter and number of cores in the optical fiber making up the light guide 20 and the size of the light receiving elements in the detector 44, thereby allowing the plurality of beams to be evaluated and processed as pseudo-individual spots.

However, there are cases where the plurality of beams of reflection light cannot be measured as is due to, for instance, limitations on the size of the detection surface of the detector 44; preferably, the reduction optics 43 is adopted in these cases. The reduction optics 43 is arranged along the optical path to the detector 44 and reduces the spot diameter of the reflection light that reflects from the object 2, propagates through the plurality of cores in the light guide 20, and enters the light receiving unit 40.

Figure 12:
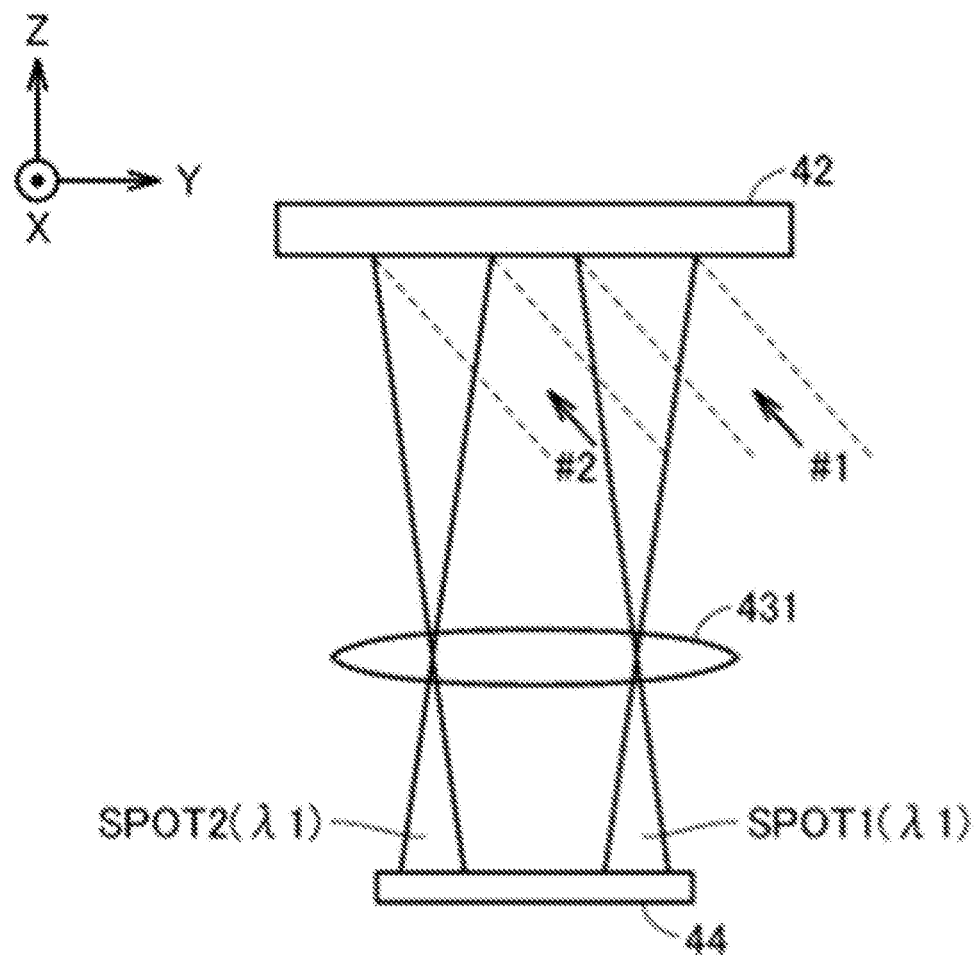
FIG. 12 is a schematic view illustrating a configuration of the reduction optics in the light receiving unit in an optical measurement device according to the embodiment.
Figure 13:
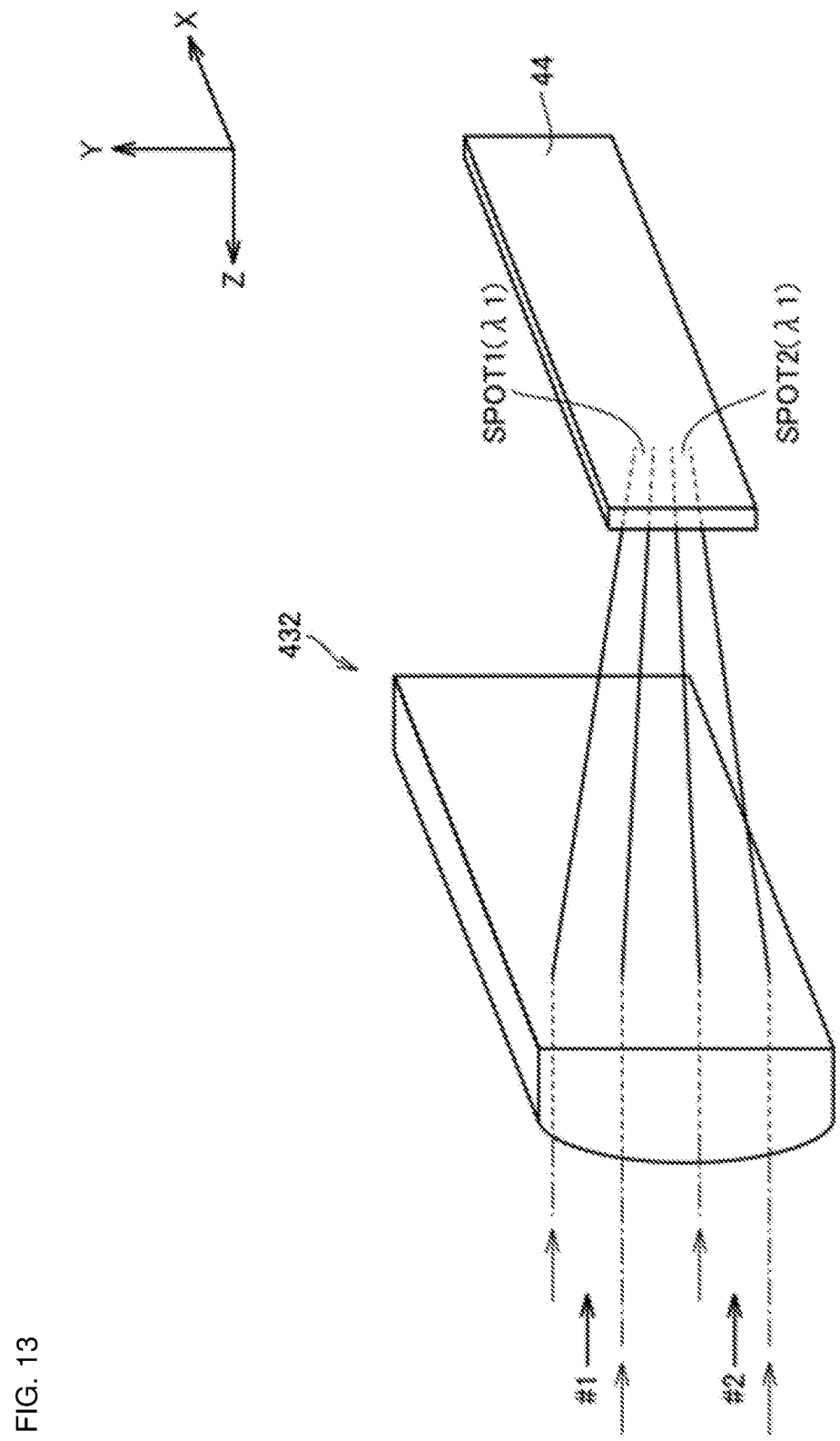
FIG. 13 is a schematic view illustrating another configuration of the reduction optics in the light receiving unit in an optical measurement device according to the embodiment.

FIGS. 12 and 13 are schematic views illustrating a configuration of the reduction optics 43 in the light receiving unit 40 in an optical measurement device 1 according to the embodiment. FIG. 12 depicts an example of adopting a circular focusing lens; FIG. 13 depicts an example of adopting a cylindrical lens.

Referring to FIG. 12, the spectrometer 42 causes the reflection light from the object 2 to reflect toward a given direction. The focusing lens 431 is arranged to coincide with this direction. The cross-sectional diameter of the focusing lens 431 is set large enough to encompass all the angular directions through which light reflecting from the object 2 may be diffracted.

Additionally, given that the optical measurement device 1 according to the embodiment adopts a plurality of cores, the optical measurement device 1 is configured so that any reflection light that radiates from the cores (labeled #1 and #2 in FIG. 12) passes through the focusing lens 431.

The spot diameter is modified by the focusing lens 431 and enters the detector 44 (SPOT1 and SPOT2 in FIG. 12). Hereby, the reduction optics can be used to adjust the size of a plurality of spots generated on the object 2 when adopting a plurality of cores, to a size where the plurality of spots can be evaluated and measured as pseudo-individual spots.

The configuration of the reduction optics illustrated in FIG. 13 can be used to generate the kind of elliptical spots illustrated in FIG. 6B. The Y-Z plane of the cylindrical lens 432 is a curved surface; on the one hand, the spot diameter is reduced along the Y direction while the size thereof is preserved in the X direction. That is, the reduction optics that uses a cylindrical lens 432 is configured so that the spot diameter of light reflecting from the object 2 is reduced to a large extent along a designated direction in accordance with the horizontal-to-vertical ratio of the detection surface of the detector 44.

Although FIG. 13 provides an example of a monolithic cylindrical lens, this may be modified to a series of cylindrical lenses in accordance with the number of spots (i.e., the number of cores).

Hereby, the reduction optics can be used to adjust to size of a plurality of spots generated on the object 2 when adopting a plurality of cores, to a size where the plurality of spots can be evaluated and measured as pseudo-individual spots. Reducing the width (length along the width direction) of the light receiving elements also tends to be difficult when using a one-dimensional sensor (a line sensor). In this case, shrinking the shape of the spots along the width direction can facilitate employing an even larger number of cores in the light guide.

Core Diameter and Core Pitch in the Light Guide

An example of a configuration of a light guide 20 adopted in the optical measurement device 1 according to the embodiment is described. This configuration is suited to a light guide 20 with a plurality of cores.

The spacing between adjoining cores becomes important when a plurality of cores is arranged within a fiber bundle. For instance, a narrow gap between adjoining cores results in a phenomenon where light of a wavelength outside a focus common to certain fibers reflects from the object 2 and enters the fibers (this phenomenon also referred hereafter as "crosstalk"). Thus, it is necessary to optimize the distance between adjoining cores to reduce the influence of crosstalk.

Figure 14A:
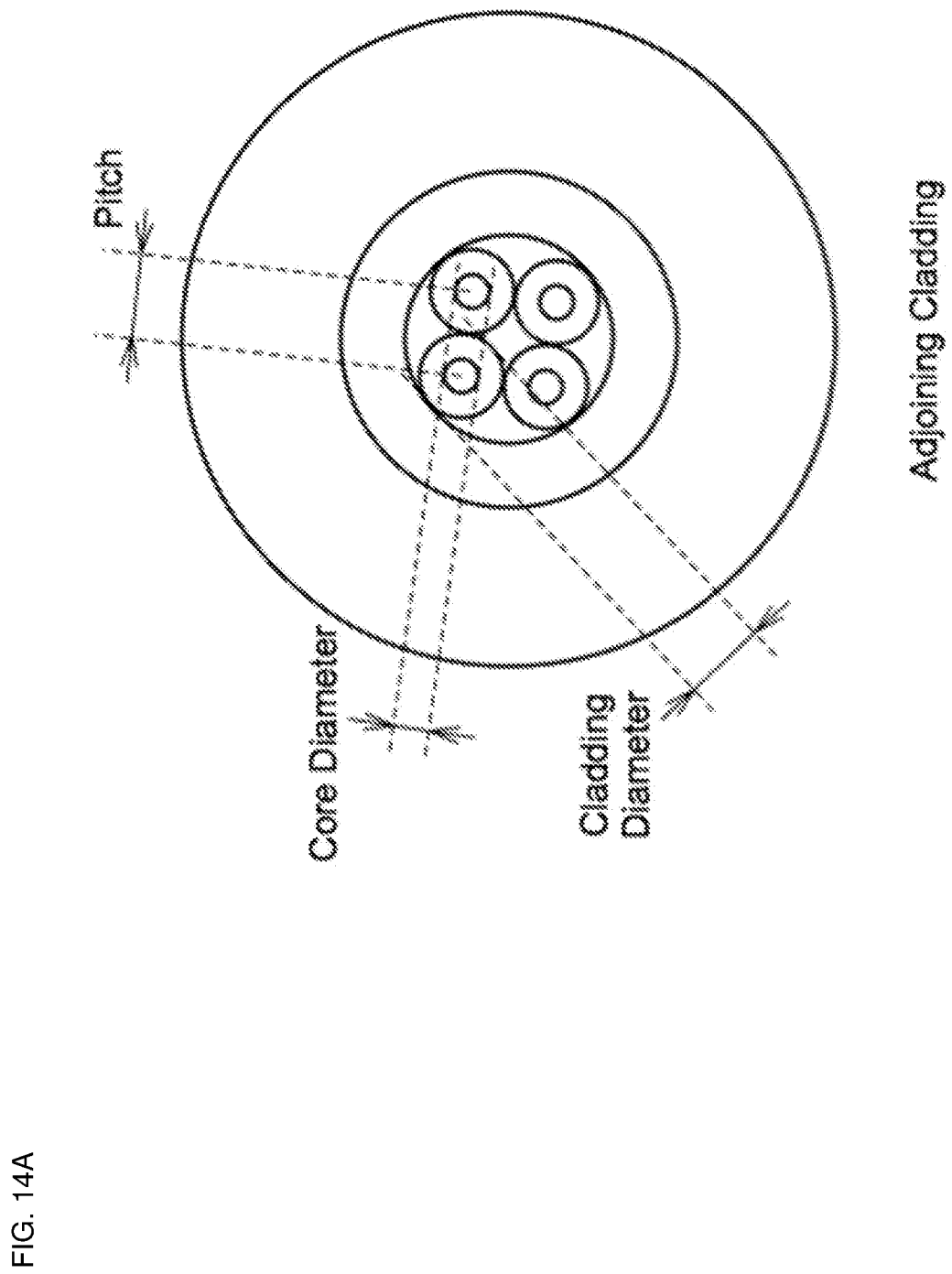
FIG. 14A and FIG. 14B illustrate examples of the cross-sectional shape of a bundle fiber including four cores.
Figure 14B:
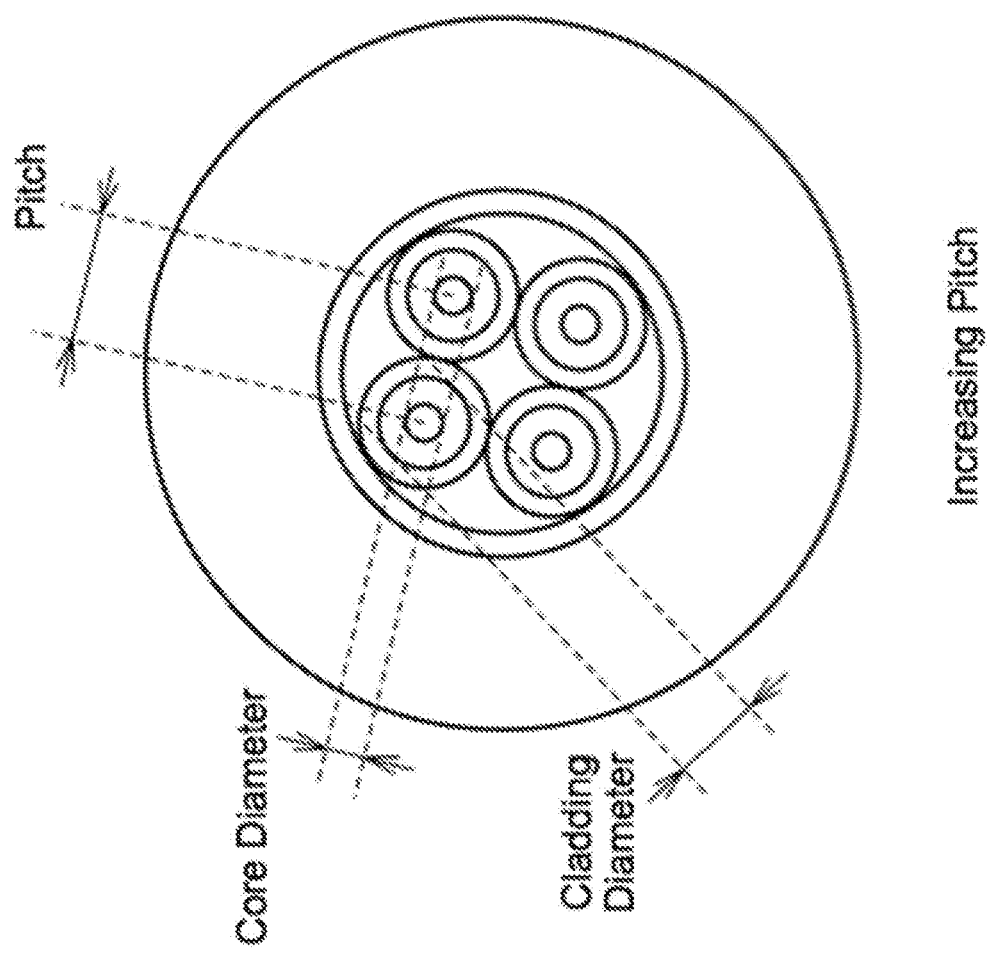

FIGS. 14A and 14B provide examples of the cross-sectional shape of a bundle fiber including four cores. The bundle fiber illustrated in FIGS. 14A and 14B houses four fibers having a predetermined core diameter and cladding diameter. FIG. 14A illustrates a configuration with the claddings adjacent (adjoining cladding), while FIG. 14B illustrates a configuration where some kind of structural element is provided around the cladding to increase the pitch of the cores (increasing pitch).

Figure 15A:
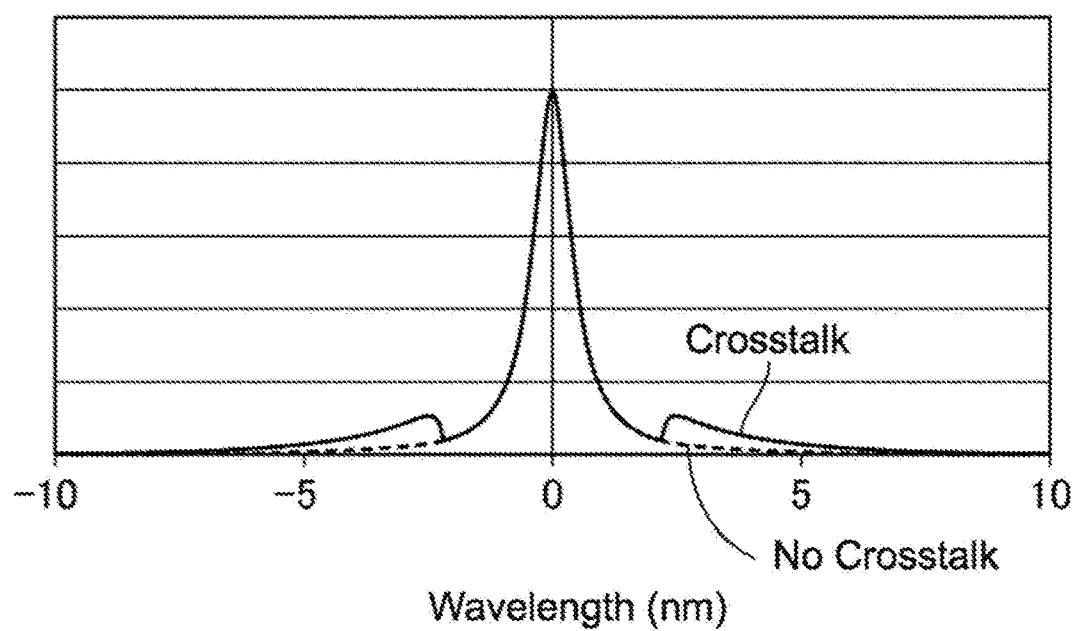
FIGS. 15A and 15B illustrate sample results from measuring the amount of crosstalk generated in the bundle fiber in FIGS. 14A and 14B.
Figure 15B:
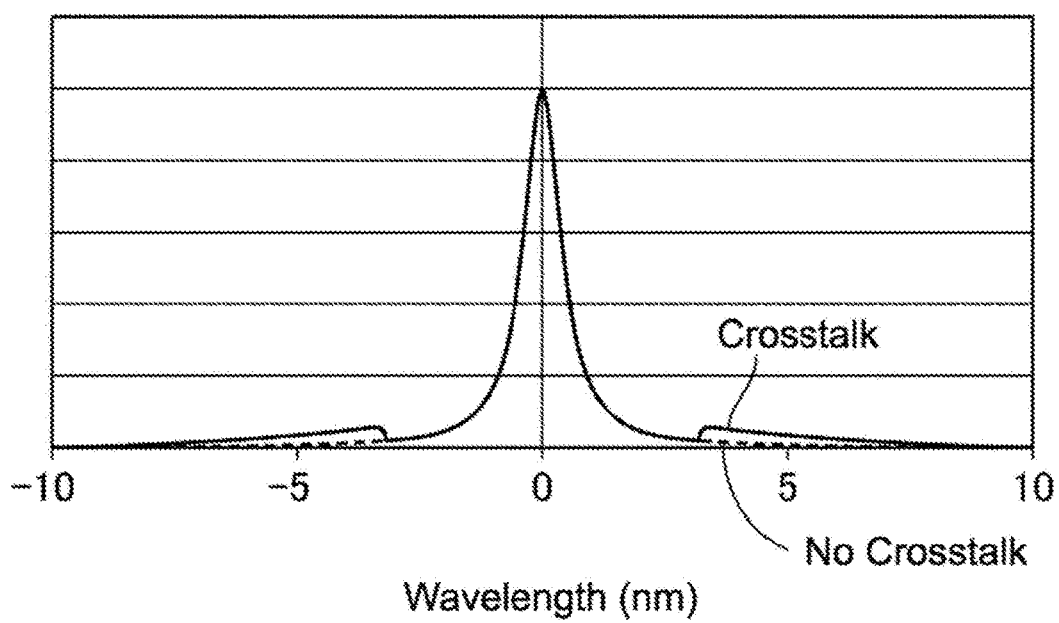

FIGS. 15A and 15B depict sample results from measuring the amount of crosstalk generated in the bundle fiber in FIGS. 14A and 14B. The evaluation results illustrated in FIGS. 15A and 15B are the results from testing the amount of light propagating through a given core that leaks into the adjacent core; the result is calculated using the spectrum of light received at the other end of a given core when light of a wavelength λ is provided to one end of each core in the plurality of cores. FIGS. 15A and 15B each compare when there is no effect (no crosstalk) from other cores, and when there is what is considered crosstalk.

In the evaluation results illustrated in FIG. 15A with the configuration shown in FIG. 14A, the crosstalk affects the reference waveform (i.e., the waveform when no crosstalk exists) to a certain extent. In contrast, in the evaluation results illustrated in FIG. 15B with the configuration shown in FIG. 14B, the crosstalk has only roughly half the effect on the reference waveform (i.e., the waveform when no crosstalk exists).

Thus, it is preferable to adopt a sensor head cable 24 in the optical measurement device 1 according to the embodiment where the cores are arranged in a way to reduce crosstalk at least at the end of the optical fiber connected to the sensor head 30.

In this manner, the pitch and the arrangement of adjacent cores in the light guide 20 of the optical measurement device 1 according to the embodiment are designed to discourage reflection light outside of a common focus from entering the light guide (crosstalk).

I. End Surface Shape for Optical Fiber in Light Guide

Next is described an example of an end surface shape for the optical fiber configuring a light guide 20 adopted in the optical measurement device according to the embodiment. A white light confocal optical measurement device illuminates an object 2 with illumination light. The optical measurement device computes the distance from the sensor head 30 to the object 2 on the basis of reflection light reflecting from the object 2. However, measurement errors may occur because of illumination light that reflects from the emission end surface of the optical fiber without ever illuminating the object 2. Therefore, it is preferable to minimize the amount of reflection that occurs at the end surface of the optical fiber.

Figure 16:
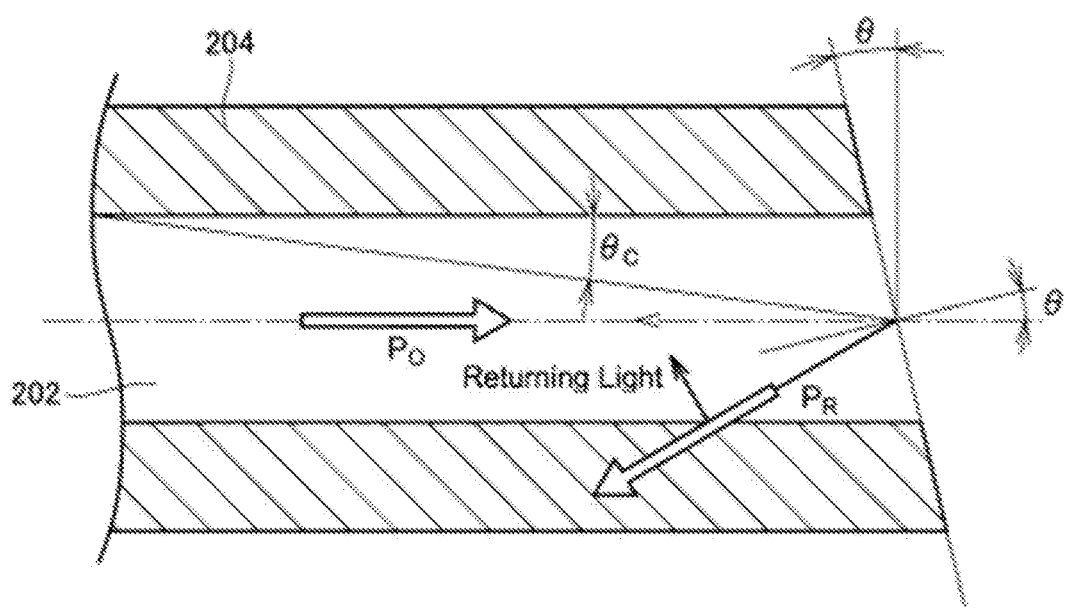
FIG. 16 is a schematic view for describing the behavior of light at the end of an optical fiber.

FIG. 16 is a schematic view for describing the behavior of light at the end surface of an optical fiber. As illustrated in FIG. 16, some of the illumination light $P_O$ propagating through the core 202 of the optical fiber becomes a reflecting component $P_R$ that reflects at the end surface of the optical fiber. The reflecting component $P_R$ strikes the interface between the core and the cladding with a predetermined proportion of light returning to the core 202. The proportion of light is determined by the difference in refractive indexes.

However, if the angle at which the reflecting component $P_R$ strikes the core-cladding interface is greater than the critical angle θc of the core-cladding interface, a majority of the reflecting component enters the cladding 204 and does not return to the core 202.

Thus, increasing the inclination θ of the end surface of the optical fiber (i.e., the angular displacement from the plane orthogonal to the optical axis direction of the core) reduces the reflectance of the core-cladding interface in relation to the reflecting component $P_R$, and thus reduces the amount of returning light generated from the light incident thereat.

In other words, in the optical measurement device 1 according to the embodiment, the end surface radiating illumination light from the light guide 20 to the sensor head 30 is inclined at an angle greater than the critical angle of the interface between the core and the cladding in the light guide 20. This reduces the amount of returning light that may cause measurement errors.

If the amount of light reflecting at the fiber end surface increases, this light encompasses the measurement light and reduces the resolution; alternatively, while in certain cases measurement may be impossible because there is little measurement light intensity, optimizing the inclination of the optical fiber end surface reduces the amount of reflection light that turns to noise at the fiber end surface relative to the measurement light, and makes it possible to measure measurement objects with even lower reflectance. Consequently, this increases the dynamic range of the measurement device.

J. Minimizing Propagation Through the Cladding

The optical fiber used in the light guide may experience a tunneling mode wherein light leaking from the core and light directly entering the cladding from the light source 10 propagate through the cladding. To minimize the amount of noise due to this kind of tunneling mode, the output cable 22 which optically connects the coupler 231, 232 and the light receiving unit 40 may be wrapped around a rod-like component.

Winding the optical fiber in this manner reduces the components in the tunneling mode that create noise, and increases the dynamic range of the measurement device.

K. Dynamically Changing the Spot Illumination Pattern

The optical measurement device 1 according to the embodiment emits illumination light from a plurality of cores and measures the reflection light generated by each beam of illumination light reflecting from the object 2. This allows the optical measurement device 1 to evaluate and process the reflection light as pseudo-individual spots. The spot illumination pattern for the illumination light may be modified as appropriate to perform measurement suited to the object 2. A process is described below for dynamically modifying the spot illumination pattern.

Figure 17:
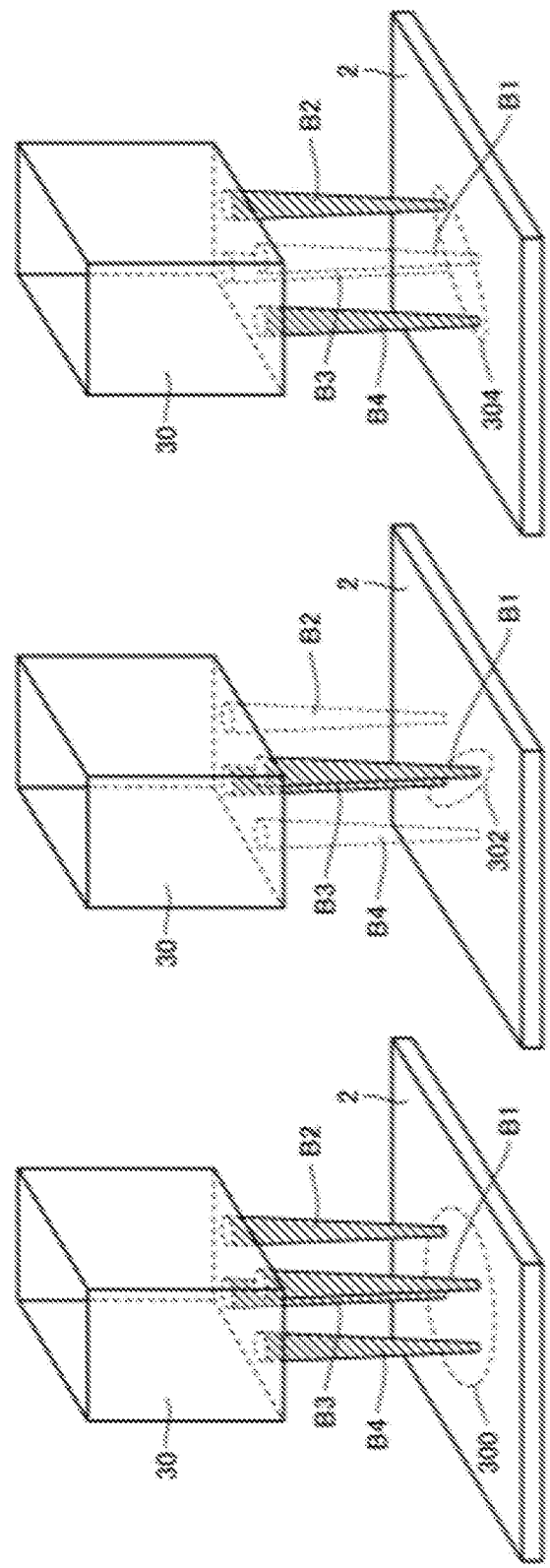
FIGS. 17A through 17C are schematic views for describing how an optical measurement device according to the embodiment illuminates a measurement object with light.

FIGS. 17A through 17C are schematic views for describing how the optical measurement device 1 according to the embodiment illuminates a measurement object with light. FIG. 17A depicts an example where the sensor head cable 24 includes four cores, and the sensor head 30 illuminates the object 2 with corresponding illumination light including beams B1, B2, B3, B4, from each of the four cores. A circular spot 300 encompassing the four beams is considered the measurement range.

FIGS. 17B and 17C depict an example where illumination light is emitted from only two of the four cores. That is, in the state illustrated in FIG. 17B, only the beams B1 and B3 are radiated, and in the state illustrated in FIG. 17C only the beams B2 and B4 are radiated. The elliptical spots 302 and 304 are considered the measurement range in the situations depicted in FIGS. 17B and 17C respectively.

The spot illumination patterns are thusly modified as appropriate in order to perform measurement suited to the object 2.

Figure 18:
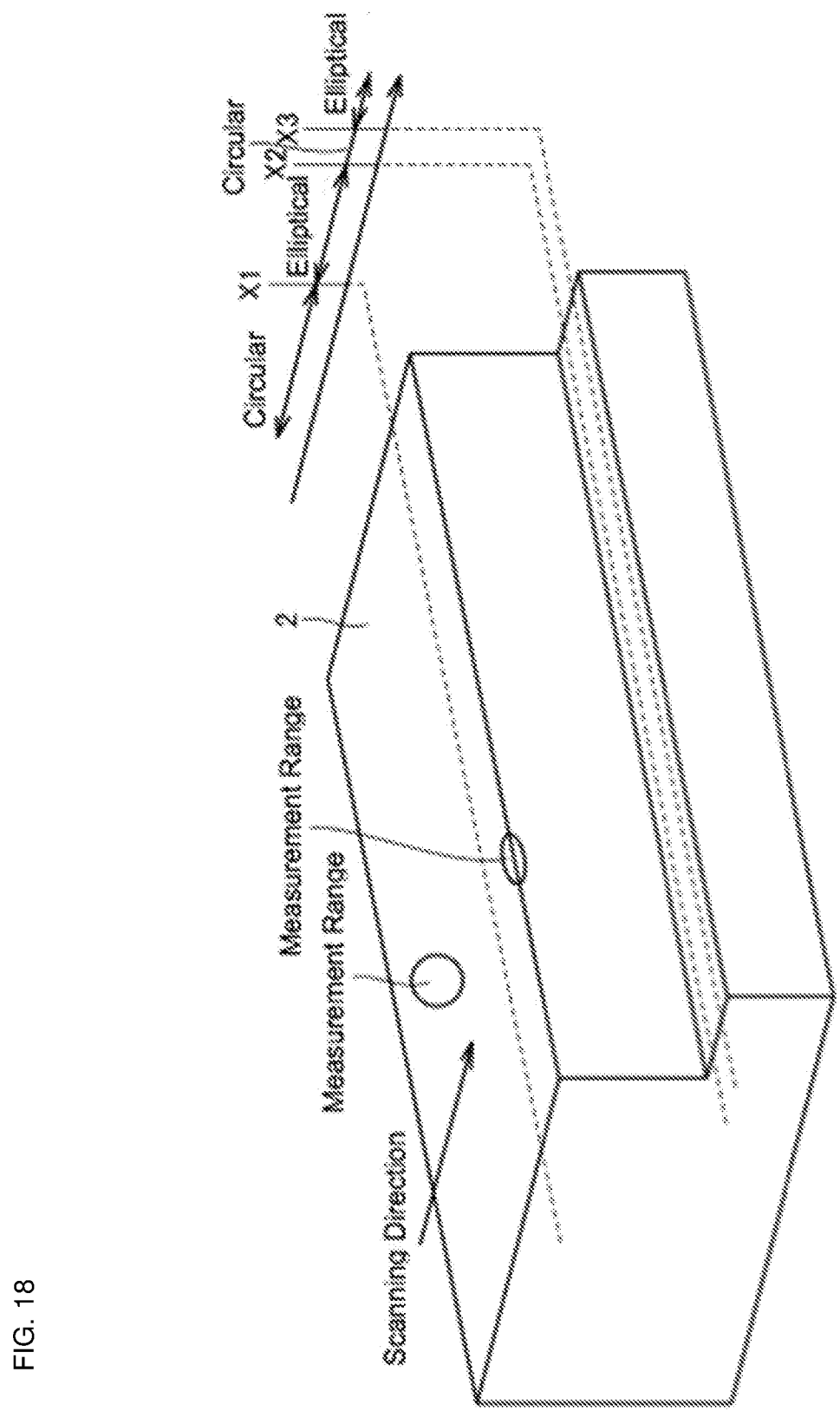
FIG. 18 is a schematic diagram for describing a practical example of modifying the spot illumination patterns illustrated in FIGS. 17A through 17C.

FIG. 18 is a schematic diagram for describing a practical example of modifying the spot illumination patterns illustrated in FIGS. 17A through 17C. Referring to FIG. 18 for example, when measuring the surface topography of an object with a plurality of stepped locations, the flat locations are preferably measured by radiating the object with all the illumination light beams to increase the dynamic range. Alternatively, when the object 2 has a rough surface, there may be cases where it is preferable to increase the measurement range to make the information more uniform.

In contrast, for locations where there are large changes in the height of the surface, changing the measurement range to an ellipse extending in the longitudinal direction of the stepped portion increases the sensitivity of the measurement to the displacement of the surface height which occurs when there is a stepped component.

For instance, conceivably, in an application that outputs illumination light in a given scanning direction, the measurement range may be changed to an ellipse within the ranges immediately before and after the stepped component (from X1 to X2, and starting from X3), while for segments outside these ranges the measurement range is kept as a circle.

Figure 19:
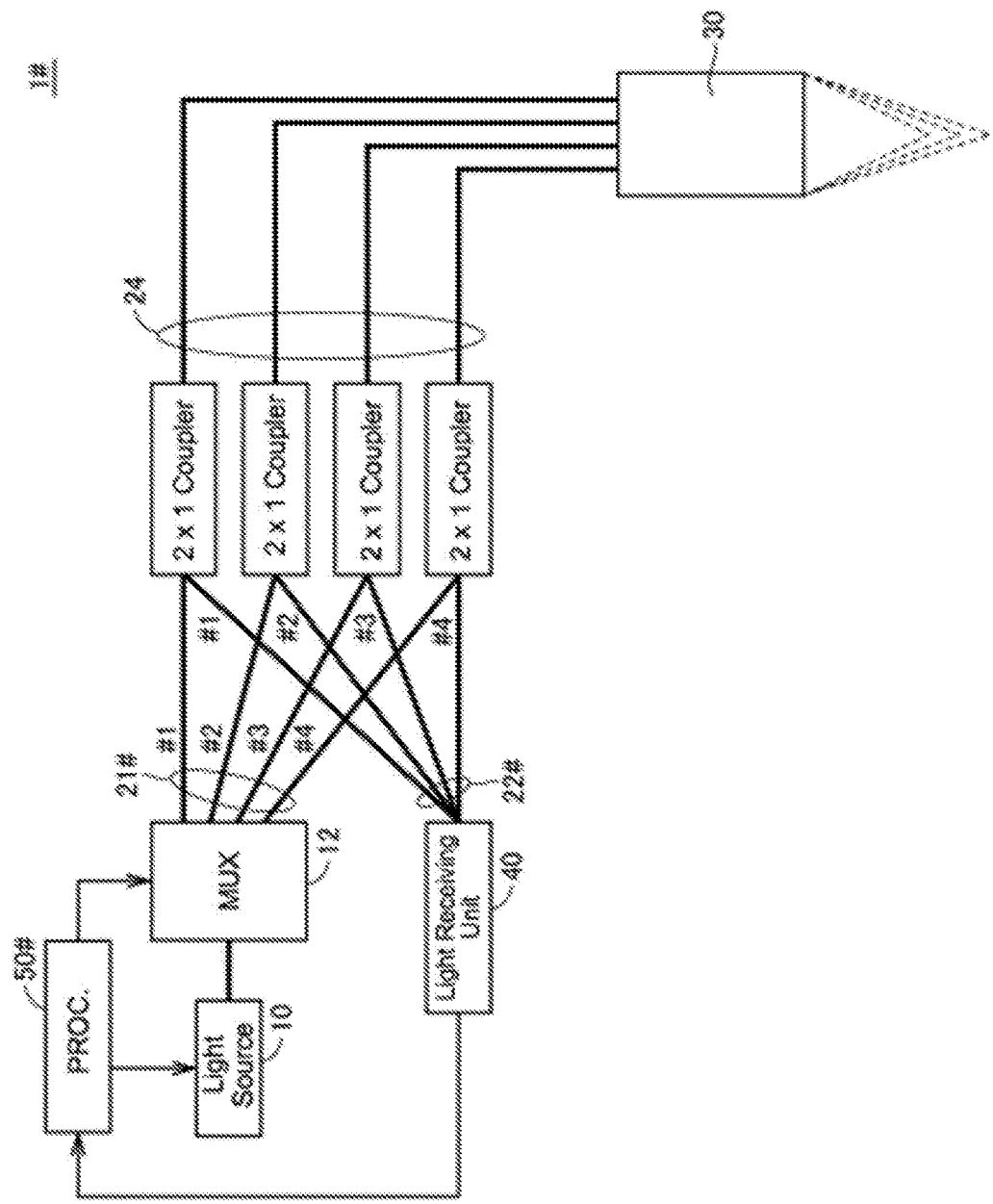
FIG. 19 is a schematic view illustrating the optical measurement device according to another embodiment.

FIG. 19 is a schematic view illustrating the optical measurement device 1# according to another embodiment. Referring to FIG. 19, the light source 10 may be provided with a multiplexer 12 at the emission end to selectively supply illumination light to the required core; this configuration allows the light source to change the kinds of spot illumination patterns shown in FIGS. 17A through 17C and FIG. 18 dynamically. The multiplexer 12 is equivalent to a selector that selectively supplies the illumination light from the light source 10 to each of the plurality of cores in the light guide 20. Note that this configuration is not limited to using the multiplexer 12; any kind optical device capable of selectively supplying illumination light may be used.

The input cable 21# and the output cable 22# may be, for instance, a bundle fiber including four cores. One end of each of the cores in the input cable 21# is optically connected to a channel in the multiplexer 12, and the multiplexer 12 outputs to the channels. The other end of each of the cores in the input cable 21# is optically connected to a 2×1 star coupler provided individually to the cores. One end of each of the cores in the output cable 22# is optically connected to a 2×1 star coupler; and the other end of each of the cores is optically connected to the light receiving unit 40. This configuration allows control of the on or off of individual beams of illumination light (beams B1, B2, B3, B4) from the sensor head 30 independently of each other.

The processor 50# sends a selection command to the multiplexer 12 to provide the suitable spot illumination pattern as illustrated in FIGS. 17A though 17C depending on the shape of the object 2. That is, the processor 50# switches between which cores to use to radiate the object 2 with illumination light.

The above-described kind of configuration improves the dynamic measurement range and allows for the most suitable measurement depending on the shape of the object 2.

L. Advantages

As above described, an optical measurement device 1 according to the embodiment adopts a plurality of cores as a light guide from the light source 10 to the sensor head 30, and as a light guide from the sensor head 30 to the light receiving unit 40. The optical measurement device 1 is thus capable of minimizing propagation loss within the light guide and detecting an even greater amount of reflection light. Therefore, compared to existing configurations, an optical measurement device according to the embodiments exhibits improved light use efficiency and allows for even higher sampling rates.

Additionally, an optical measurement device 1 according to the embodiment optimizes the core pitch and the shape of the core end surface. An optical measurement device 1 according to the embodiment is thus able to minimize the noise component due to crosstalk and returning light, and is capable of providing a greater dynamic range.

The above-described embodiments are not the only forms of the invention; portions of the above-described configurations may be combined as appropriate.

All aspects of the embodiments disclosed should be considered merely examples and not limitations as such. The scope of the present invention is not limited to the above description but to the description in the claims, and is intended to include all equivalents and modifications allowable by the claims.

The invention claimed is:

1. An optical measurement device comprising:
   a light source;
   a sensor head;
   a light receiving unit comprising a spectrometer and a detector comprising a plurality of light receiving elements;
   a light guide;
   a selector; and
   a processor, wherein
   the light source emits illumination light comprising a plurality of wavelength components;
   the sensor head introduces an axial chromatic aberration into the illumination light from the light source and receives reflection light reflecting from a measurement object wherein at least a portion of the measurement object lies along a line extending from the optical axis of the sensor head;
   the spectrometer of the light receiving unit separates the reflection light received at the sensor head into wavelength components, and the plurality of light receiving elements of the detector are arranged one-dimensionally to correspond to the dispersion direction of the spectrometer;
   the light guide comprises a plurality of cores optically connecting the sensor head and the light receiving unit;
   a pitch is established between adjoining ones of the plurality of cores to reduce crosstalk between the adjoining ones of the plurality of cores;
   the processor is configured with a program to compute a distance from the sensor head to the measurement object on the basis of a detection value from each of the plurality of light receiving elements in the light receiving unit;
   the light guide and the light receiving unit are configured so that a first beam of a first wavelength is provided from the sensor head to a first core among the plurality of cores, and the light receiving elements at which the first beam enters is the same as at least a portion of the light receiving elements at which a second light beam of the first wavelength enters, and the second light beam is provided from the sensor head to a second core among the plurality of cores;
   the selector selectively supplies illumination light from the light source to each of the plurality of cores in the light guide; and
   the processor is further configured with the program to cause the selector to supply illumination light to selected cores of the plurality of cores in the light guide such that the illumination light illuminates the measurement object in a predetermined illumination pattern in accordance with a shape of the measurement object.

2. The optical measurement device according to claim 1, wherein a part of the light guide optically connected to the light receiving unit is arranged so that an alignment direction of the plurality of cores maps to a direction orthogonal to the arrangement direction of the plurality of light receiving elements.

3. The optical measurement device according to claim 1, wherein the processor is further configured with the program to collectively acquire the detection values generated based on a plurality of light beams radiating from each of the plurality of cores entering a single light receiving element.

4. The optical measurement device according to claim 1, wherein the light receiving unit further comprises: reduction optics arranged along an optical path to the detector and configured to reduce a spot diameter of the reflection light that reflects from the measurement object, propagates through the plurality of cores included in the light guide, and enters the light receiving unit.

5. The optical measurement device according to claim 4, wherein the reduction optics reduce the spot diameter of the reflection light reflecting from the object to a larger extent in a specific direction in accordance with a horizontal-to-vertical ratio of the detection surface of the detector.

6. The optical measurement device according to claim 1, wherein an end surface of the light guide radiating illumination light from the light guide to the sensor head is inclined at an angle greater than a critical angle of an interface between the core and the cladding in the light guide, wherein total internal reflection in the light guide occurs at angles less than the critical angle.

7. The optical measurement device according to claim 1, wherein the light guide comprises an optical fiber wrapped around a rod-like component.

8. The optical measurement device according to claim 1, wherein the pitch is established between adjoining ones of the plurality of cores by sheathing each of the plurality of cores with one or more of a cladding layer and a separating structure to reduce the crosstalk between the adjoining ones of the plurality of cores.

9. An optical measurement device comprising:
a light source;
a sensor head;
a light receiving unit comprising a spectrometer and a detector comprising a plurality of light receiving elements;
a light guide;
a selector; and
a processor, wherein
the light source emits illumination light comprising a plurality of wavelength components;
the sensor head introduces an axial chromatic aberration into the illumination light from the light source and receives reflection light reflecting from a measurement object wherein at least a portion of the measurement object lies along a line extending from the optical axis of the sensor head;
the spectrometer of the light receiving unit separates the reflection light received at the sensor head into wavelength components, and the plurality of light receiving elements of the detector are arranged two-dimensionally on a detection surface;
the light guide comprises a plurality of cores optically connecting the sensor head and the light receiving unit;
a pitch is established between adjoining ones of the plurality of cores to reduce crosstalk between the adjoining ones of the plurality of cores;
the processor is configured with a program to compute a distance from the sensor head to the measurement object;
the processor is configured with the program to compute the distance from the sensor head to the measurement object using detection values from the plurality of light receiving elements in the light receiving unit on the basis of a positional relationship between a first area on the detection surface where a first light beam of a first wavelength enters, the first light beam is provided from the sensor head to a first core among the plurality of cores, and a second area on the detection surface where a second light beam of the first wavelength enters, and the second light beam of the first wavelength is provided from the sensor head to a second core among the plurality of cores;
the selector selectively supplies illumination light from the light source to each of the plurality of cores in the light guide; and
the processor is further configured with the program to cause the selector to supply illumination light to selected cores of the plurality of cores in the light guide such that the illumination light illuminates the measurement object in a predetermined illumination pattern in accordance with a shape of the measurement object.

10. The optical measurement device according to claim 9, wherein the processor is further configured with the program to estimate an area suitable for detecting each of the wavelengths on the basis of a light intensity profile generated from spots of light beams of the same wavelength emitted from the plurality of cores and incident on the detection surface of the detector.

11. The optical measurement device according to claim 9, wherein the processor is further configured with the program to select a sub-region of the detection surface of the detector to detect each of the wavelengths included in the reflection light.

12. The optical measurement device according to claim 9, wherein the light receiving unit further comprises: reduction optics arranged along an optical path to the detector and configured to reduce a spot diameter of the reflection light that reflects from the measurement object, propagates through the plurality of cores included in the light guide, and enters the light receiving unit.

13. The optical measurement device according to claim 12, wherein the reduction optics reduces the spot diameter of the reflection light reflecting from the object to a larger extent in a specific direction in accordance with a horizontal-to-vertical ratio of the detection surface of the detector.

14. The optical measurement device according to claim 9, wherein the light guide comprises an optical fiber wrapped around a rod-like component.

15. The optical measurement device according to claim 9, wherein the pitch is established between adjoining ones of the plurality of cores by sheathing each of the plurality of cores with one or more of a cladding layer and a separating structure to reduce the crosstalk between the adjoining ones of the plurality of cores.

* * * * *